United States Patent [19]
Hill

[11] Patent Number: 5,876,085
[45] Date of Patent: Mar. 2, 1999

[54] ADJUSTABLE VEHICLE SEAT

[75] Inventor: Kevin E. Hill, Mequon, Wis.

[73] Assignee: Milsco Manufacturing Company, Milwaukee, Wis.

[21] Appl. No.: 807,568

[22] Filed: Feb. 27, 1997

[51] Int. Cl.[6] .................................................. B60N 2/02
[52] U.S. Cl. ........................................................ 296/65.02
[58] Field of Search ........................... 297/300, 326, 297/335, 345; 296/65.02, 65.05; 248/575

[56] References Cited

U.S. PATENT DOCUMENTS

| | | |
|---|---|---|
| 974,769 | 11/1910 | Hoff . |
| 1,639,371 | 8/1927 | Freeman . |
| 1,732,169 | 10/1929 | Provost et al. . |
| 1,747,932 | 2/1930 | Dufaux . |
| 1,836,353 | 12/1931 | Withrow . |
| 1,942,998 | 1/1934 | Browne . |
| 3,165,351 | 1/1965 | Clancy et al. . |
| 3,261,422 | 7/1966 | Jensen . |
| 3,390,857 | 7/1968 | Nystrom . |
| 3,727,974 | 4/1973 | Swenson et al. . |
| 3,873,055 | 3/1975 | White . |
| 4,148,518 | 4/1979 | Vibeuf . |
| 4,198,092 | 4/1980 | Federspiel . |
| 4,312,491 | 1/1982 | Aondetto . |
| 4,350,317 | 9/1982 | Aondetto . |
| 4,382,573 | 5/1983 | Aondetto . |
| 4,408,798 | 10/1983 | Mizushima et al. . |
| 4,687,250 | 8/1987 | Esche . |
| 4,729,539 | 3/1988 | Nagata . |
| 4,768,762 | 9/1988 | Lund . |
| 4,813,645 | 3/1989 | Iwami . |
| 4,880,201 | 11/1989 | Hall et al. . |
| 4,890,810 | 1/1990 | Sakamoto . |
| 4,926,760 | 5/1990 | Sack . |
| 4,941,641 | 7/1990 | Granzow et al. . |
| 5,037,155 | 8/1991 | Holm et al. . |
| 5,058,852 | 10/1991 | Meier et al. . |
| 5,127,699 | 7/1992 | Maezawa et al. . |
| 5,154,402 | 10/1992 | Hill et al. . |
| 5,169,112 | 12/1992 | Boyles et al. . |
| 5,222,709 | 6/1993 | Culley, Jr. et al. . |
| 5,224,750 | 7/1993 | Clark et al. . |
| 5,251,864 | 10/1993 | Itou . |
| 5,273,260 | 12/1993 | Nagata ................................ 296/65.02 |
| 5,364,060 | 11/1994 | Donovan et al. . |
| 5,580,027 | 12/1996 | Brodersen . |

*Primary Examiner*—Stephen Avila
*Attorney, Agent, or Firm*—Nilles & Nilles, S.C.

[57] ABSTRACT

A vehicle seat having a base that is carried by a floor on a seat adjuster that comprises two pairs of seat slide rails that permit the seat to be moved relative to the floor with at least one of the rails being of non-metallic, preferably plastic, construction. The non-metallic rails have an upper rail portion spaced from a lower rail portion defining a channel therebetween for receiving a flange of the other seat slide, preferably without requiring ball, roller or needle bearings. Preferably, the base and plastic rails are of one piece unitary construction for producing a low profile adjuster. Each of the other rails is preferably constructed of a metal, has a bottom wall anchored to the floor, and a pair of sidewalls with one of the sidewalls carrying the flange and the other of the sidewalls being notched. A latch is pivotally connected to the base enabling a grip of the latch to be lifted to free a latch tooth from a slide rail notch enabling the seat to be moved. The seat further includes a suspension that preferably is a single pivot suspension having deformable elastomeric springs that can be moved to adjust the firmness of the suspension. Each spring is preferably attached to the base or seat by a pivot enabling it to be swung about the attachment pivot toward or away from the seat pivot.

62 Claims, 8 Drawing Sheets

ADJUSTABLE VEHICLE SEAT

FIELD OF THE INVENTION

This invention relates generally to a vehicle seat having a seat adjuster and suspension which are both adjustable to provide different levels of resistance and comfort, and more particularly to a seat position adjuster having a space saving low profile design that is well suited for small off-road vehicles and which uses springs that can be moved fore and aft relative to the seat to adjust the amount of resistance provided by the seat suspension.

BACKGROUND OF THE INVENTION

Vehicle seats typically have a suspension used to support a person sitting in a seat while maximizing their comfort. As such, suspensions for vehicle seats are designed to provide comfort to a seat occupant while minimizing or absorbing and dampening bumps and jolts due to uneven, rough or rugged terrain encountered while riding in a vehicle. In fact, designing suspensions for vehicle seating sometimes requires a designer to consider a number of factors, such as, for example: seat vibration, natural frequency of the seat and suspension, the suspension characteristics of the vehicle, the type of terrain that will be encountered by the vehicle, how far the seat suspension is capable of travelling to absorb shocks during operation, vehicle seat size and packaging constraints, how the seat and suspension will behave during a crash, component and suspension cost, suspension reliability and durability, how easy and cost-effectively the suspension can be mass produced, as well as other design factors.

These design factors apply not only to vehicle seat suspensions for automotive vehicles, such as trucks and automobiles, but also to seat suspensions for off-road vehicle applications, such as garden tractors, lawn mowers, smaller all terrain vehicles, other preferably self-propelled lawn and garden equipment, and the like. In many cases, design considerations for these types of off-road vehicles can be equally complicated in part because of the severe manufacturing cost constraints imposed by manufacturers. In short, because these vehicles are relatively low cost, manufacturers demand vehicle seating which is also low cost but which must be reliable, durable, and which minimizes shocks, jolts, bumps and vibrations encountered during vehicle operation to prevent them from being directly transmitted to a person sitting in the seat.

Most, if not virtually all, of the seat suspensions for these types of vehicles are single pivot seat suspensions because of their simplicity, reliability and low cost. A single pivot seat suspension has a seat attached adjacent one end, typically its front end, to a base or frame by a single pivot. Spaced away from the pivot, typically adjacent the rear end of the seat, is at least one and typically a pair of springs disposed between the bottom of the seat and the seat base or frame. During operation, the seat hingedly swings about the seat attachment pivot in response to jolts, bumps, shocks and the like allowing the spring or springs to help absorb and dampen them.

In the past, most, if not virtually all, of these springs were metallic coil compression springs that were fixed in one position relative to the seat pivot. While coil spring suspensions are known which permit adjustment of the location of the spring or springs relative to the pivot, they require time consuming and expense-adding fasteners to fasten one end of the coil spring to the seat suspension frame in a manner which allows spring position adjustments to be made.

An example of such a seat suspension is disclosed in U.S. Pat. No. 4,198,092 to Federspiel which discloses a suspension for a lawn tractor seat that has a single coil spring which is secured at one end by a nut threadably received on a bolt that extends through an elongate adjustment slot in the seat frame and also through a hole in the end of the spring to clamp the end of the spring to the underside of the seat.

However, the other end of the spring, although preferably vinyl coated, can eventually scratch or mar the finish of that portion of a fender assembly of the lawn tractor which underlies and supports the spring. Moreover, the nut and bolt used to secure the spring to the seat require unnecessary, time consuming and costly manufacturing assembly steps to attach the spring to the seat during manufacturing the seat assembly. Additionally, coil springs are becoming less favored by seat suspension designers because they have a generally constant spring rate throughout their range compression. For example, when they bottom out during a particularly severe bump or jolt such that the spring is completely compressed, they bottom out particularly hard exposing the seat occupant to discomfort and possible injury. Sill further, coil springs often provide little damping ability therefore exposing a seat occupant to a rather bouncy ride which can ultimately undesirably translate into discomfort, nausea, and, quite possibly, at least some difficulty in steering or maneuvering the vehicle. Finally, coil springs have also become disfavored because they are noisy and, even if vinyl or plastic coated, the coating can wear away undesirably exposing the finish of the lawn tractor directly to the spring.

More recently, springs constructed of a urethane foam material have been substituted for metallic coil springs. While these types of seat suspensions employing foam springs have performed admirably out in the field, they have not heretofore been known to be adjustable for seat occupants of different weights and for the different types of terrain that can be encountered by the vehicle. This is likely because foam springs are difficult to attach to a seat base or a portion of a frame underlying the seat as a result of their flexible construction enabling them to be compressed inwardly in just about any direction, unlike coil springs.

Therefore, as a result of posing at least some difficulty in attaching foam springs to a seat or seat base underlying the spring, foam springs are attached to a vehicle seat or base underlying the seat in a manner which fixes their position relative to the front or rear of the seat and relative to the pivot of the seat, if the suspension is of single pivot construction. More specifically, it is known that foam springs have been attached using time consuming and expensive fasteners in a manner similar to that used for securing coil springs to a seat suspension. In another known method of securing a foam spring, an end of the spring is captured between a pair of fingers of the seat or seat base by sliding the spring between the fingers from the side, also fixing the position of the spring relative to the seat suspension pivot.

Vehicle seat adjusters are used to enable the fore and aft position of a vehicle seat to be adjusted relative to a steering wheel or vehicle dashboard permitting a seat occupant to optimize their comfort by increasing or decreasing legroom. While vehicle seat adjusters which use roller, ball or needle bearings disposed between a pair of interlocking metal seat slide rails are well known, they are relatively expensive to manufacture. In addition, the ball bearings and slide rails raise the seat off the vehicle floor limiting their use to vehicles which have more seating room. As a result, these types of conventional seat slide rails are not commonly used on the rather compact and inexpensive seats that are used in smaller, more inexpensive off-road vehicles, such as garden tractors and the like.

What is needed is a seat suspension for non-metallic, urethane, and other compression springs which permits the suspension to be adjusted to tailor the characteristics of the suspension for the weight of a seat occupant or the terrain likely to be encountered by the vehicle to give a seat occupant more comfort and protection against injury. What is further needed is a seat suspension for an elastomeric spring that allows one or both springs of the suspension to be moved relative to the front or rear of the seat to provide seat suspension weight adjustment capability. What is also needed is a foam spring single pivot seat suspension that permits one or both springs to be moved relative to the vehicle seat attachment pivot to provide seat occupant weight adjustment capability. What is still further needed is a seat suspension that is able to accommodate both foam springs and other non-metallic springs of generally cylindrical substantially elastomeric construction that can be shaped for the type and direction of load encountered. What is also needed is a seat suspension that is able to accommodate non-metallic springs of generally cylindrical and substantially solid construction while providing seat occupant weight and vehicle terrain compensating adjustment. What is still further needed is a vehicle seat adjuster for relatively small off-road vehicle applications that is relatively inexpensive to manufacture, durable, and which is of compact low profile construction.

SUMMARY OF THE INVENTION

A vehicle seat having a vehicle seat position adjuster that uses slidably interlocked seat slide rails that require no rolling bearing support between the interlocked rails to facilitate relative movement between the interlocked rails and between the seat and floor of the vehicle. Preferably, one of the rails is of plastic construction and is preferably integrally formed as part of a light-weight, relatively compact, plastic seat supporting base.

The vehicle seat preferably can also include a seat suspension having spring receiving channels with each channel constructed and arranged to enable a spring received in the channel to be moved along the channel relative to the seat to adjust the weight resisting and load supporting characteristics of the suspension. The spring preferably is a compression spring of elastomeric and substantially cylindrical construction having a load supporting core composed of a urethane foam material or another non-metallic substantially homogeneous material that is at least slightly deformable to absorb bumps, shocks, jolts and the like. In a preferred spring embodiment, the spring is composed of a non-porous copolyester elastomer for enabling springs of non-cylindrical and non-straight construction to be produced thereby permitting copolyester compression springs to be shaped or configured for the type or nature of the load encountered by the suspension.

The seat is a vehicle seat having a seat base underlying the seat and a seat platform carrying the seat. The platform preferably is a shell that can be of unitary, one-piece construction. Carried by the seat platform is a seat occupant supporting surface that generally consists of the fabric and padding that directly underlie a person sitting in the seat. The suspension preferably is a single pivot seat suspension that consists of a pivot at or adjacent one end of the seat which hingedly attaches the seat platform to a pedestal that extends upwardly from the base. The base preferably is constructed of a polymeric or an elastomeric material, such as a plastic or the like, that is easy and inexpensive to mold.

The seat attachment pivot preferably consists of at least one elongate and generally cylindrical pin which extends through complementary bores in spaced apart arms of the platform and through a bore in the pedestal. A pair of springs of the suspension are spaced a distance away from the seat attachment pivot and provide resistance to bumps, jolts, and changes in direction, inertia or momentum to give an occupant of the seat a comfortable and safe ride. In a preferred single pivot vehicle seat suspension embodiment, the seat attachment pivot is located at or near the front the seat and the springs are spaced rearwardly from the seat attachment pivot, disposed underneath the seat.

The springs are each received in a channel operably associated with either the seat platform or the seat base. The channel is constructed and arranged to permit a spring received in the channel to be moved some distance along the channel toward or away from the seat attachment pivot to adjust its distance from the pivot. Each channel is of a length that permits a spring received in the channel to be moved relative to the seat attachment pivot or another component of the seat or the seat suspension. Preferably, each channel is of elongate construction, extending longitudinally in a direction from front to rear of the seat while being offset to one side of a central longitudinal axis of the seat.

In a preferred embodiment, the length of the channel is at least about twice the cross sectional diameter of the spring at its narrowest diameter. In a preferred embodiment, the channel length is at least about twice the length the cross sectional diameter of its spring retaining groove. In another embodiment, the length of the channel is about three times the cross sectional diameter of the spring for allowing the spring to be located in at least three positions in the channel, particularly if the channel has three detents.

To enable a spring received in a channel to be retained in the channel, each channel has a pair of spaced apart sidewalls. To help retain a spring received in the channel, the sidewalls of each channel are preferably spaced apart sufficiently to permit entry of one end of a spring into the channel. To help positively retain a spring in the channel while allowing the spring to move along the channel in a direction generally transverse to its longitudinal axis, each spring has a groove that is captured by the sidewalls or an inturned flange of each sidewall. To limit movement toward or away from the seat attachment pivot, the channel has at least one end wall. To limit movement toward and away from the pivot, the channel has an end wall at each end of the channel.

To facilitate insertion into a channel or removal from a channel, each channel can be constructed a clearance zone where there is no spring capturing sidewall or flange. With a spring of deformable construction, clearance zones are not always necessary because the spring preferably can be inserted into a channel lacking a clearance zone or removed from a channel lacking a clearance zone by simply applying enough force to the spring to urge the end of the spring into the channel. In either case, to further facilitate insertion or removal, each spring can be constructed having a necked down portion adjacent the retaining groove that extends from an adjacent axial end of the spring to the groove.

To help the spring remain captive to the seat base while enabling it to move relative to the seat attachment pivot, a preferred spring embodiment is constructed with a tab that extends radially outwardly from the spring. A spring of this construction can be pivotally attached to either the underside of the seat platform or a top surface of the seat base. A stub shaft or peg attaches the spring tab to the base or platform and forms a pivot about which the spring can be swung to position the spring closer to or farther away from the seat attachment pivot. By moving the spring about its pivot, its position relative to the seat attachment pivot can be adjusted thereby selectively increasing or decreasing the firmness or load supporting characteristics of the suspension.

For positioning a pair of springs received in the suspension about the same distance away from the seat attachment pivot, each channel can have two or more detents which are constructed and arranged to retain a spring in the channel at a specific location in the channel. To position a pair of springs both about the same distance away from the seat attachment pivot to balance the load supporting characteristics of each side of the suspension, both channels are of substantially the same length having a front end well each located about the same distance away from the pivot and a rear end wall each located about the same distance away from the pivot. For providing discrete suspension load adjustment settings, each corresponding pair of detents of both channels are each located about the same distance away from the seat attachment pivot to enable the springs to be located about the same distance away from the pivot for a particular seat suspension setting.

Each detent can preferably consist of a pair of opposed arcuately shaped cutouts forming a detent that is of complementary construction to a spring of generally circular cross section. Between each pair of adjacent detents of a channel, adjacent arcuate cutouts are separated by inwardly extending projections and each pair of opposing projections are spaced apart by a distance that is less than the narrowest cross sectional width or diameter of the spring to resist the spring from passing between the projections. Since the springs are constructed of a deformable material, the projections of the detents and springs are constructed and arranged to only permit passage of a spring through a pair of detent projections by the application of sufficient force.

Detents can be formed between the mating surfaces of the spring and base tabs. For example, the bottom surface of the spring tab can be constructed having one or more spaced apart bosses that engage with complimentary recesses in the top surface of the seat base enabling the spring to be positioned at discrete locations relative to the seat attachment pivot.

In a preferred suspension embodiment, the channels are pockets or indentions molded into either the seat base or seat platform. In another preferred embodiment, the channels are punched, machined, thermoformed or otherwise introduced into either the base or the platform. To reinforce the channel region, the channel can have (a) a floor or bottom against which an inserted spring bears when the spring is loaded, (b) a stringer across and underneath the channel connecting the sidewalls together to prevent them from separating when a load is applied to a spring inserted into the channel; and (c) an upstanding ridge about the periphery of the channel to prevent sidewall separation while structurally stiffening the channel region. Preferably, the upstanding ridge can be constructed and arranged to also help prevent spring buckling or spring collapse.

In a still further preferred suspension embodiment, the channels make up part of a spring carrier plate that is operably associated with either the seat base or the seat platform. The spring carrier plate preferably is constructed of a sheet of a generally rigid material having holes molded, punched or machined into the plate to define the spring receiving channels. Preferably, the spring carrier plate is constructed of a sheet of plastic, metal or another suitably stiff and flexurally rigid material that is secured by one or more fasteners to either the underside of the seat platform or the seat base.

By its construction, the spring carrier plate preferably simply functions as a spring locator and preferably is not constructed to handle the load of the spring during operation. As such, it preferably is located between the platform and base and is preferably secured to, affixed to, or carried by either the platform or the base. If desired, the spring carrier plate can be a load bearing plate.

To enable the seat to be moved forwardly or rearwardly relative to the vehicle floor, the bottom of the seat base preferably rides on a pair of separate transversely spaced apart longitudinally extending fixed seat slide rails that cooperate with a latch carried by the base to form a seat adjuster. Each fixed seat slide rail preferably is anchored to the floor of the vehicle and has at least one upstanding stop for limiting seat travel. Each seat slide rail has a bottom wall attached to the vehicle floor by a fastener, an upstanding sidewall and an outwardly extending flange that is received in a complementary channel in the seat base. Preferably, the flange is of generally flat and smooth construction for being received in a channel in the seat base that is also flat and smooth for minimizing friction between the seat base and fixed slide rail. If desired, the channel can have an insert of nylon, steel or another resilient, durable, and relatively low friction material for minimizing friction between the base and the fixed slide rails. Lubricants can be added to or impregnated in the channel or fixed slide rail for minimizing friction between the fixed slide rail and seat base during operation.

Each fixed seat slide rail has another upstanding sidewall with spaced notches for receiving a portion of a latch therein. The latch has a hand grip portion and a pair of spaced apart latch teeth that are each received in a notch when the latch is in the latched position. The latch is mounted by a pivot pin that extends through a pair of spaced apart ears and a pair of mounts in the underside of the seat base. A spring is disposed between the latch and the base for urging the latch toward its latched position.

Preferably, each channel in the base is defined by an integral seat slide rail that moves in unison with the base because it is integrally formed as part of the vehicle seat base. Each integral movable slide rail has an upper slide rail portion and a lower slide rail portion spaced from the upper slide rail portion by an interconnecting web. Preferably, the integral movable slide rail slidably interlocks with the fixed rail such that the base can move relative to the vehicle floor. Preferably, both the base and integral seat slides are formed of a plastic to enable both components to be quickly and inexpensively molded of one piece, unitary construction. The base preferably also includes an upstanding pedestal that rises upwardly from the base to space the seat off the floor.

In operation, the hand grip of the latch is grasped preferably by a seat occupant and lifted, disengaging the latch teeth from each fixed slide rail thereby permitting the seat to be moved. The seat is then moved forwardly or rearwardly until a desired position is reached and the latch is released. When the latch is released, the teeth engage the fixed seat slides by being received in a notch thereby locking the seat in the desired fore/aft position preventing its further movement.

Preferably, the integral movable slide rails are composed of plastic and the fixed seat slide rails are composed of a metal such that there is no metal-to-metal contact between pairs of slidably interlocked slide rails. This construction is advantageous because it requires no rolling-type bearing support and has a pair of rails integral with the base producing a seat adjuster of exceptionally low profile construction thereby enabling the construction of smaller seats that fit in smaller spaces while still being fore and aft adjustable.

Objects, features and advantages of this invention are to provide a suspension for a vehicle seat that can support a load placed on its seat platform; is flexibly able to absorb static and dynamic loads applied to the suspension due to jolts, bumps and shocks encountered during operation of a vehicle as well as the weight of a seat occupant; is capable of being adjusted to compensate for the weight of the occupant by simply moving one or both springs relative to the pivot of the suspension until the desired amount of adjustment is achieved; is flexibly able to be adjusted for the type of terrain likely to be encountered by positioning one or both springs relative to the pivot; utilizes load carrying compressible elastomeric springs for producing a suspension of relatively compact construction enabling it to be used in relatively small spaces; utilizes elastomeric springs which have an increasing spring rate as deformation increases for preventing the suspension from completely bottoming out in response to a rather large jolt or shock; is capable of utilizing a copolyester elastomeric spring that can be shaped to fit the load applied to the suspension; is capable of utilizing a thermoplastic elastomeric spring for reducing the time and cost needed to manufacture each spring while decreasing scrap; can be adjusted fore and aft; includes a seat adjuster of simple, durable, rugged and relatively inexpensive construction; is a seat adjuster that is of low profile construction making it well suited for applications where space is a minimum; is a seat adjuster formed of a plastic base and seat slides of integral, one and unitary construction producing an inexpensive seat adjuster of low profile construction well suited for small off-road vehicles having limited vehicle seat packaging space; is a seat suspension of low cost construction that affords both position and weight adjustment; and is a seat suspension that is strong, rugged, easy to assemble, durable, of simple design, compact construction, economical manufacture and which is easy to use and operate.

BRIEF DESCRIPTION OF THE DRAWINGS

These and other objects, features, and advantages of this invention will become apparent from the following detailed description of the best mode, appended claims, and accompanying drawings in which:

DETAILED DESCRIPTION OF THE INVENTION

Figure 1:
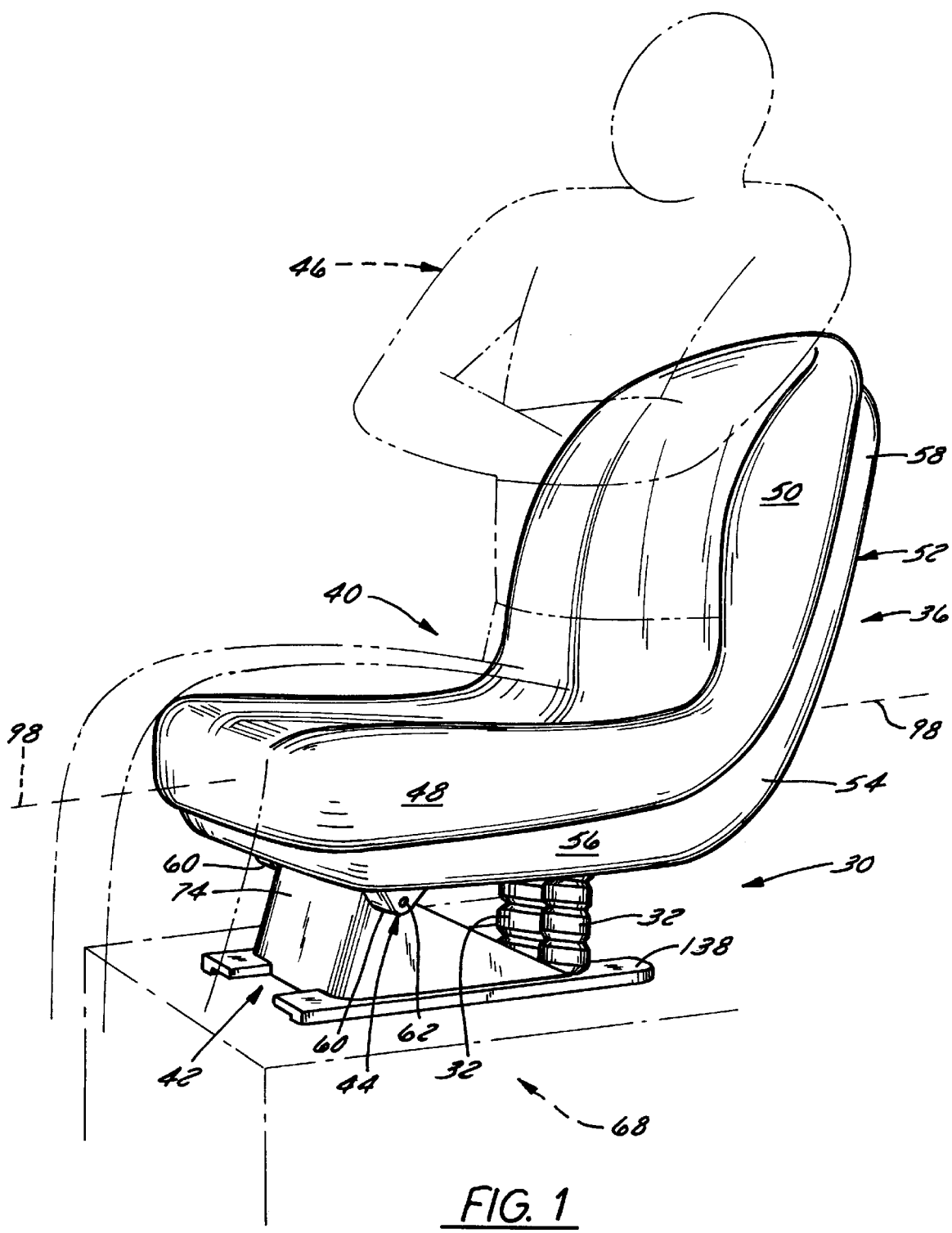
FIG. 1 is a perspective view of a vehicle seat having an adjustable seat suspension.
Figure 2:
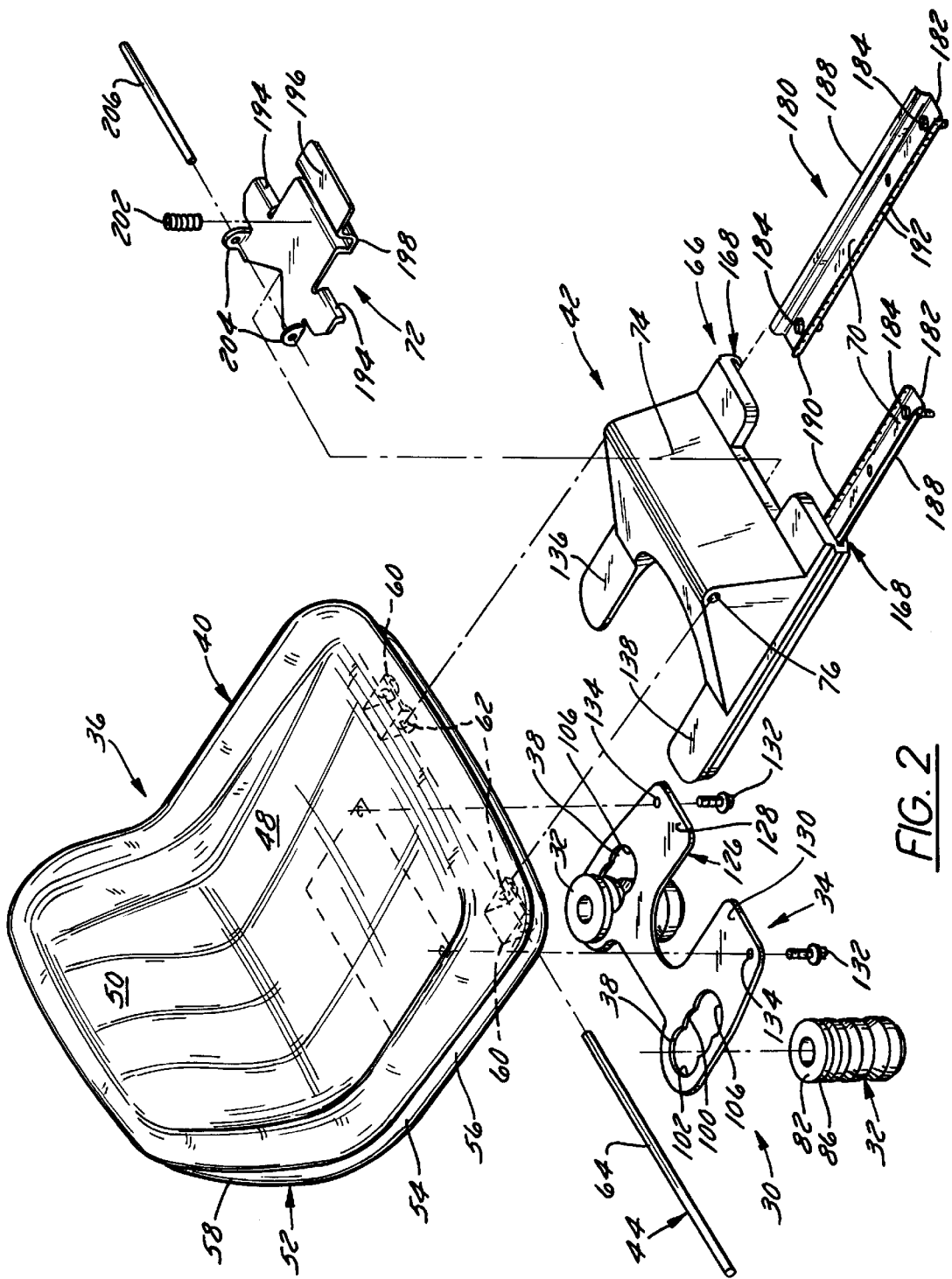
FIG. 2 is an exploded view of the seat and suspension.

Referring to the drawings, FIGS. 1 & 2 illustrate a seat suspension 30 having at least one non-metallic or elastomeric spring 32 received and retained by a spring carrier 34 (FIG. 2) which is constructed and arranged to permit the spring 32 to be selectively moved forwardly or rearwardly relative to the seat suspension 30 to adjust the suspension for the weight of the seat occupant 46 (shown in phantom in FIG. 1) as well as the terrain likely to be encountered, if the seat suspension 30 is used with a vehicle seat 36. Preferably, the spring carrier 34 has at least one spring receiving channel 38 that receives and retains a spring 32 while permitting the spring 32 to be moved along the channel 38 to adjust the load supporting characteristics of the seat suspension 30.

Preferably, this adjustable seat suspension 30 is particularly well suited for use with vehicle seats 36 and with vehicle seats 36 having a seat 40 coupled to a seat base 42 by a single pivot 44. Preferably, the seat suspension 30 utilizes a pair of unidirectionally deformable springs 32, each of which are adjustable relative to the pivot 44 to selectively increase or decrease the amount of mechanical advantage of the seat suspension possess to thereby enable the seat suspension 30 to be adjusted to accommodate seat occupants 46 of different weights as well as the terrain likely to be encountered by a vehicle ridden by the seat occupant 46.

As is shown in FIGS. 1 & 2, the seat 40 comprises a bottom seat cushion 48 which supports the buttocks and legs of a seat occupant 46 and a seat back cushion 50 for supporting the lower lumbar region and back of the seat occupant 46. Although a seat back 50 is shown, the seat suspension 30 can be used with seats that do not have a seat back.

The seat cushions 48 & 50 are carried by a platform 52 which preferably is a shell 54 molded of a relatively rigid plastic, a resin, an elastomer, a metal, or constructed of another similarly strong, durable, relatively rigid and resilient material. The shell 54 preferably is of one piece, unitary construction.

In FIG. 1, the platform 52 has a generally horizontal portion 56 which underlies and supports the bottom seat cushion 48 and a generally upwardly extending seat back support portion 58 to which the seat back cushion 50 is secured. The seat cushions 48 & 58 make up a seat occupant supporting surface upon which a person sits when sitting in the seat 36. Adjacent the front end of the platform 52 there are a pair of spaced apart and downwardly extending arms 60, each arm 60 of which has a generally horizontally extending through bore 62 (FIG. 2) for receiving a preferably generally cylindrical pin 64 that makes up the pivot 44 of the single pivot seat suspension 30 shown in the drawing figures.

The seat base 42 has a bottom portion 66 that preferably is either (a) fixedly attached to another component, such as the floor pan or frame 68 (FIG. 1) of a vehicle and/or (b) carried by a pair of seat slide rails 70 (FIG. 2) which cooperate with a seat slide latching mechanism 72 to enable the seat 40 to be selectively moved forwardly or rearwardly (fore or aft) relative to a dash panel (not shown) or steering wheel (not shown) of a vehicle and thereafter retained in that desired position. Extending upwardly from the bottom portion 66 of the seat base 42 is a pedestal 74 through which a pivot pin receiving through bore 76 extends. The pivot pin receiving bore 76 preferably is adjacent the top of the pedestal 74 and the pedestal is constructed to space the seat 40 above the vehicle floor 68 to provide leg room for the seat occupant 46.

Figure 3A:
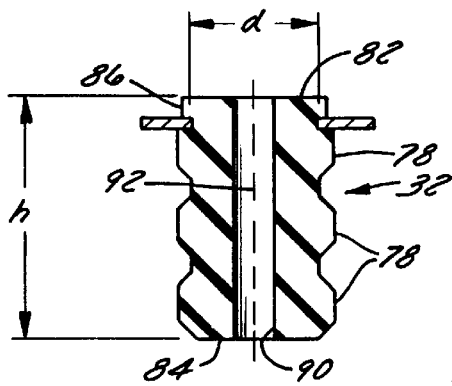
FIG. 3A is a cross sectional view of a unidirectionally deformable load supporting spring of generally straight construction used in the seat suspension.
Figure 3B:
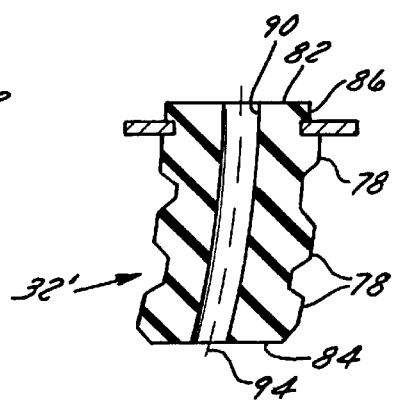
FIG. 3B is a cross sectional view of a copolyester elastomeric load supporting spring, in an unloaded condition, of generally non-straight, curved or arcuate construction.
Figure 12:
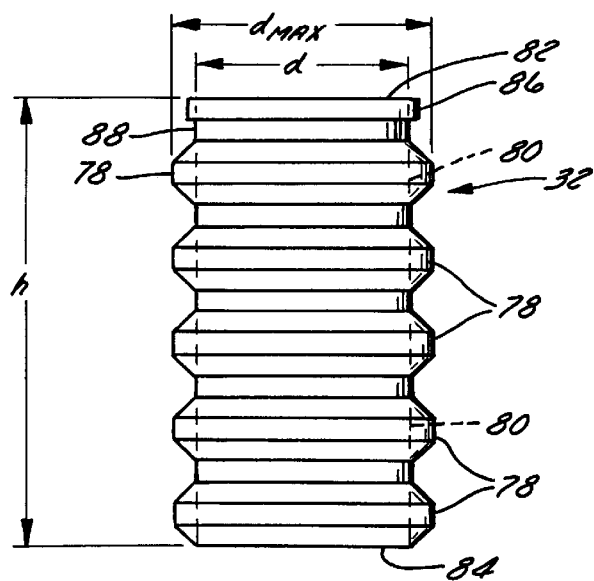
FIG. 12 is an enlarged side view of an elastomeric spring illustrating various details of its construction.

FIGS. 3A, 3B and 12 illustrate the spring 32 of the suspension in more detail. Preferably, the spring 32 has a cross sectional width of d and a height of h. If the spring has ribs 78, such as is depicted in FIGS. 3A, 3B & 12, the cross sectional width, d, of the spring 32 is the cross sectional width of its load supporting core 80, shown in phantom in FIG. 12, and not the maximum cross sectional width, $d_{max}$, of the spring 32 taken along one or more of the ribs 78. Although the spring 32 can be of square, rectangular, triangular or another cross sectional shape, the spring preferably is of generally cylindrical construction having a load receiving upper end 82, a load transferring lower end 84, and a substantially non-metallic or elastomeric load supporting core 80 between the ends 82 & 84. Preferably, the load supporting core 80 is of completely non-metallic construction.

To enable the spring 32 to be captured by the carrier 34, one end preferably has a necked down portion 86 with a retainer groove 88 spaced axially inwardly from the end of the spring 32. The necked down portion 86 is constructed to facilitate engagement with the spring carrier 34 preferably by helping to ease its insertion into a channel 38 of the carrier 34. The necked down portion 86 of the spring 32 preferably is wider than the width of the channel 38 and the retaining groove 88 narrower than the channel 38 or about the same width as the channel 38 so that the spring 32 complementarily interlocks with the channel 38 or a portion of the channel 38, such as in the manner shown in FIGS. 3A & 3B, so that it is captured by the spring carrier 34 once it is inserted into the channel 38.

The spring 32 preferably is constructed of a flexible, resilient and tough material having a spring rate or spring modulus suitable for use as a compression-type spring. Preferably, the spring 32 is constructed of a material that is unidirectionally deformable, that is, at least slightly deformable in compression in any direction. Preferably, the spring 32 is constructed of a non-metallic material this is suitably flexible, resilient, and tough enough to be used as a compression spring and which can capably perform as a compression spring while enduring a wide range of relatively hot and cold temperatures likely to be encountered by a vehicle during operation.

Figure 10:
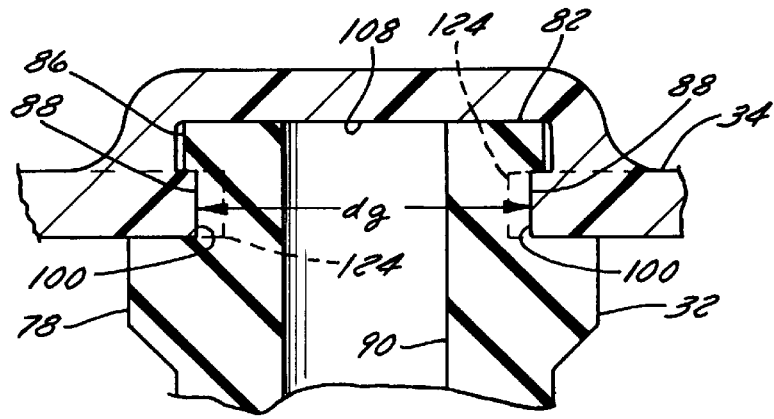
FIG. 10 is a fragmentary cross sectional view of an end of a spring captured in a spring receiving channel of a spring carrier.

Preferably, the spring 32 is composed of an elastomeric material or a polymer having a support core 80 that is substantially homogenous but which can have a hollow center 90, such as is depicted in FIGS. 3A, 3B & 10, if desired. However, the support core 80 can be of solid construction, such as is shown in FIG. 12, if desired.

In a preferred spring embodiment, the spring 32 is composed of a microcellular foam that preferably is a thermoset urethane foam which is unidirectionally compressible. While urethane foam is a preferred material for making the spring 32, a second preferred embodiment of the spring 32 preferably can be composed of a thermoplastic such as nylon or the like. More preferably, the spring 32 can be composed of a thermoplastic elastomer that preferably is a copolyester elastomer such as HYTREL, a registered trademark of Du Pont, RITEFLEX, a registered trademark of Hoechst-Celanese, ECDEL, a registered trademark of Eastman Chemical, and LOMOD, a registered trademark of General Electric Plastics. If desired, the spring 32 can be composed of an elastomeric alloy composed in part of a copolyester elastomer.

Copolyester elastomers are particularly well suited for use in making the springs 32 exemplified in FIGS. 3A, 3B & 12 because they are generally tougher over a broader range of temperatures than urethane foam material, have excellent dynamic properties, possess a high modulus of elasticity, have good elongation properties and tear strength, and resist flex fatigue at both high and low temperatures. As a result of these mechanical properties, springs 32 constructed of a copolyester elastomer possess an increasing spring rate as the spring 32 compresses advantageously preventing the suspension 30 from bottoming out during a severe bump, unlike what can occur where metal coil springs are used. Additionally, a spring 32 constructed of a copolyester elastomer is known to provide some internal damping of shocks, jolts and bumps, also unlike metal coil springs, Copolyester elastomers are also particularly well suited to the kind of operating environment that can be encountered by a vehicle seat 36 of a vehicle. More specifically, copolyester elastomers maintain their properties at service temperatures as cold as about minus 40° Fahrenheit and as hot as about 300° Fahrenheit.

In addition to possessing suitable mechanical properties for use as a spring 32 of the inventive suspension, copolyester elastomers are thermoplastics making them well suited for flexible, fast, economical and therefore cost-effective manufacturing methods such as injection molding, extrusion, rotational molding, flow molding, thermoforming and melt casting. Preferably, they can even be processed in powder form. By these manufacturing methods, the cycle time to produce each spring 32 is reduced, as compared to thermoset materials, further making a spring 32 constructed of a copolyester elastomer more economical to produce. Moreover, since copolyester elastomers are thermoplastics, any scrap or defective springs produced can be simply and economically reprocessed, such as by being reground and/or remelted, and recycled, unlike thermoset materials which must expensively be disposed of.

As a result of their advantageous forming properties, copolyester elastomer springs 32 can be molded or formed such that they are substantially straight, such as the spring 32 having a generally straight central longitudinal axis 92 shown in FIG. 3A, or non-straight, such as the unloaded curved spring 32' having the non-straight, generally arcuate longitudinal axis 94 shown in FIG. 3B. Since single pivot seat suspensions typically load each spring along an arc, the ability of copolyester elastomers to be formed to produce a curved or arc shaped spring 32' is particularly advantageous and unlike metal and foam springs. Moreover, as a result of the forming flexibility inherent in copolyester elastomers, springs 32 or 32' of other shapes and configurations can be made, such as for advantageously tailoring the shape and/or configuration of the spring for the distribution, type or nature of the load or loads that will be or likely will be encountered by the spring 32 or 32' and/or its associated suspension.

Another advantage to copolyester elastomer springs 32 is that they can be easily dyed to a color that matches the seat 40, the frame of the vehicle or to a desired color used in the aesthetic color scheme for that vehicle or seat 40. In addition to being easily dyed, a spring 32 or 32' constructed of a copolyester elastomer can be easily painted.

If HYTREL is used, it can be one of the many commercially available grades, such as grade nos. 63458W, G4074, G4078W, G4774, G4778, G5544, 4056, 4069, 4558, 5526, 5556, 6356, 7246, 8238, 3078, HTR4275BK, 5555HS, HTR56128K, HTR6108, HTR806B, HTR8139LV, HTR8171, HTR8206 available from Du Pont or another suitable HYTREL formulation or an equivalent. If HYTREL or another copolyester elastomer is used, it preferably contains an UV stabilizer or carbon black to provide the spring 32 or 32' with good weathering resistance.

FIGS. 2–11 illustrate a spring carrier 34 constructed and arranged to receive at least one spring 32 and preferably a pair of spaced apart springs 32 in a manner that enables them to moved relative to either the front or rear of the seat 40 to adjust the load supporting characteristics of the suspension 30. The carrier 34 preferably has a pair of spaced apart spring receiving channels 38, each for receiving one end 86 of the spring 32 while constructed such that it captures the spring 32 in a manner that allows it to be selectively moved along the channel 38 while being retained in the channel 38. Preferably, each channel 38 is constructed and arranged to releasably retain or releasably capture a spring 32 without requiring any fastener.

Figure 4:
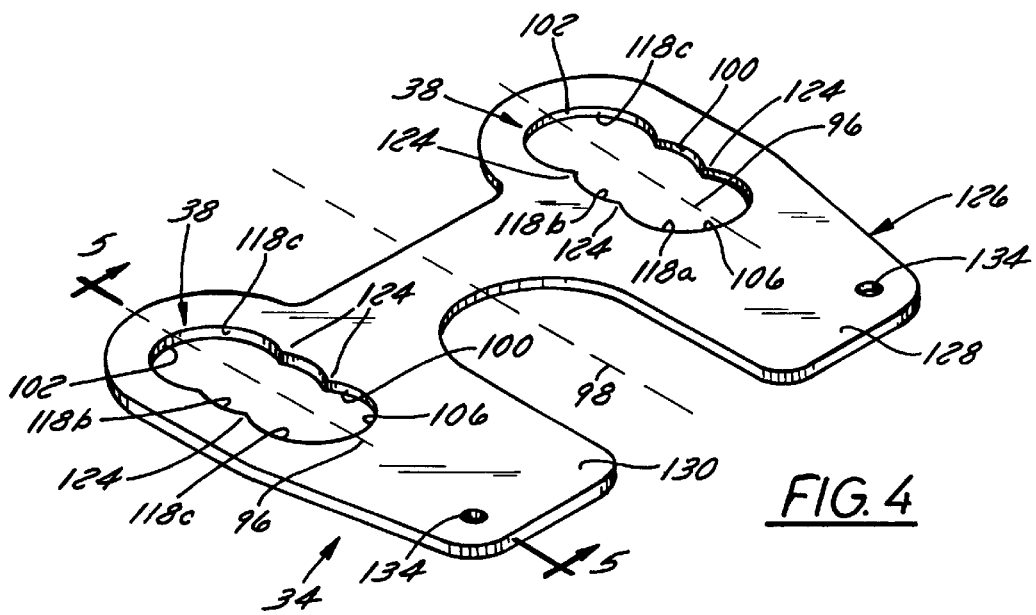
FIG. 4 is a perspective view of a spring carrier plate for receiving, retaining and spacing apart a pair of load supporting springs.
Figure 5:
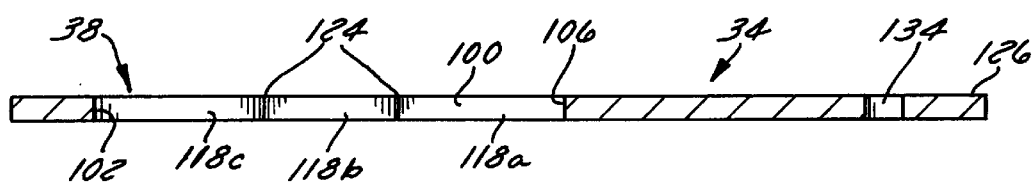
FIG. 5 is a cross sectional view of the spring carrier plate taken along line 5—5 of FIG. 4.
Figure 8:
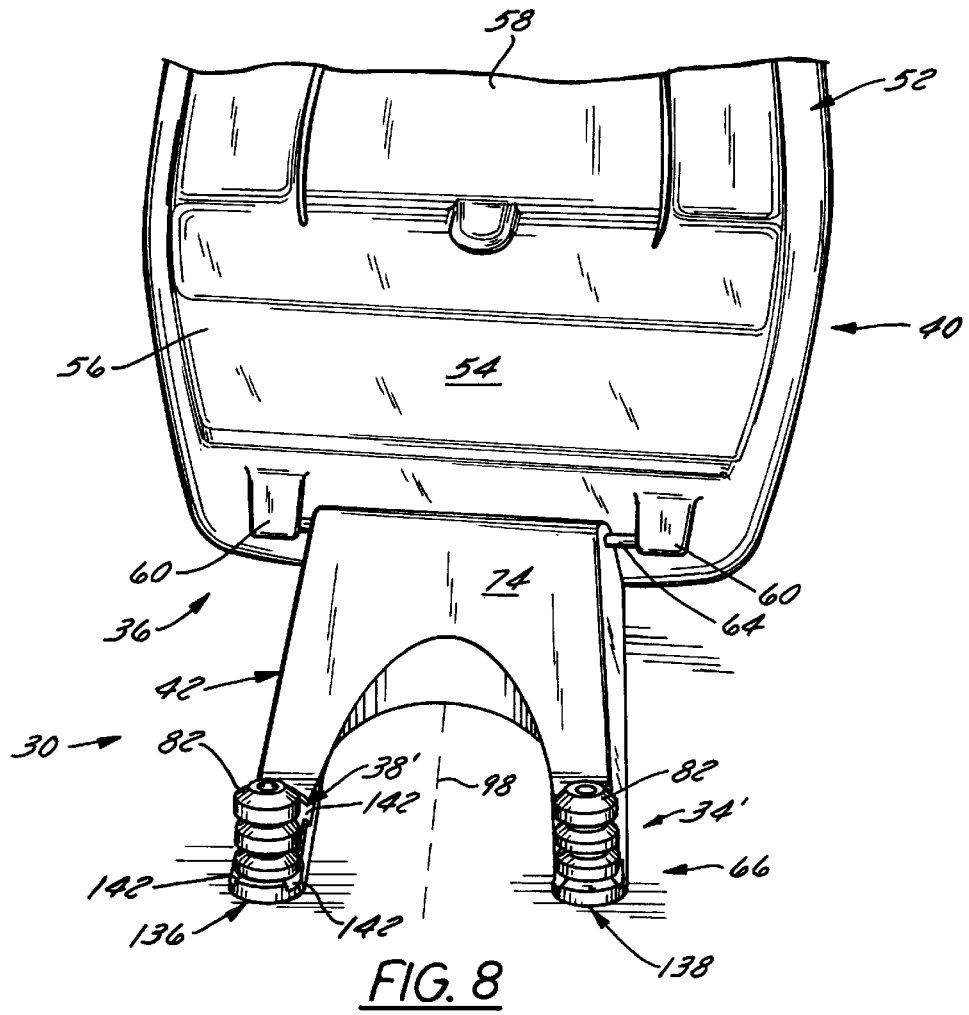
FIG. 8 is a rear perspective view of the seat suspension showing the base carrying springs.

Preferably, each channel 38 is of elongate construction and is oriented such that its longitudinal axis 96 extends in a direction generally parallel or generally tangent to a central axis 98 of the seat 40 that extends from the front of the seat 40 to the back of the seat 40 in the direction shown in FIGS. 1, 4, & 8. If desired, each channel 38 of a spring carrier 34 can be oriented such that its axis 96 is slightly acutely angularly offset relative to the central axis 98 of the seat 40 by an amount that is within the range of about ±20° of the seat axis 98.

As is shown in FIGS. 2, 3A, 3B, 4, and 6–11, each channel 38 has a pair of spaced apart sidewalls 100 that define the channel 38 and at least one end wall 102 for stopping movement of a spring 32 received in the channel 38 relative to the channel 38 and/or channel sidewalls 100. Preferably, the channel sidewalls 100 are constructed and arranged to engage the spring 32 in such a manner that the spring 32 is retained in the channel 38 but can relatively freely move along the channel 38. Preferably, a portion of each sidewall 100 or an inturned flange 104 on each sidewall 100 extends inwardly to engage the spring 32 by being received in the groove 88 at or adjacent the end of the spring 32 thus interlocking the spring 32 substantially in the manner shown in FIGS. 3A, 3B & 10. Preferably, each channel 38 has a pair of spaced apart end walls 102 & 106 that act as spring stops to define limits of forward (end wall 106) and rearward (end wall 102) travel of a spring 32 received in the channel 38.

In a preferred embodiment, the length of each channel 38 is at least slightly greater than the cross sectional width or diameter of the spring 32 it receives to allow the spring 32 to be moved at least somewhat along the channel 38. Preferably, the channel length is at least about twice the cross sectional diameter of the spring 32 at its narrowest diameter. In a preferred embodiment, the channel length is at least about twice the length the cross sectional diameter of its spring retaining groove 88. In another diameter, the length of the channel is at least about three times the cross sectional diameter of the spring 32 for allowing the spring 32 to be located in at least three positions in the channel 38, particularly if the channel 38 has three or more detents 118.

A number of mechanisms can be used to structurally rigidify the spring carrier 34 in the region of each channel 38 to make each channel 38 stronger and to better transfer the load of a spring 32 to the carrier 34 and the surrounding or adjacent seat component 42 or 52. In FIG. 10, the spring carrier 34 has a spring support wall 108 which receives the load from one end of the spring 32 and which supports the spring 32. The support wall 108 extends from one sidewall 100 to the other sidewall 100 of a channel 38 and is spaced axially from the sidewalls 100 to provide clearance to receive one end of a spring 32 in the channel 38. By this construction, the support wall 108 also prevents the sidewalls 100 of a channel from separating from each other.

Figure 9:
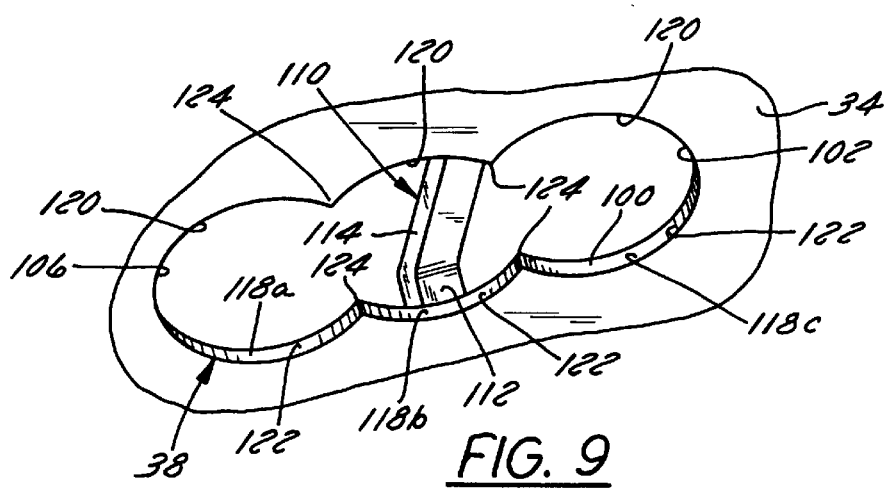
FIG. 9 is a fragmentary perspective view of a spring receiving channel of the spring carrier reinforced by a stringer extending from one sidewall of the channel to the other sidewall of the channel to prevent the sidewalls from separating when a load is applied to a spring received in the channel.
Figure 11:
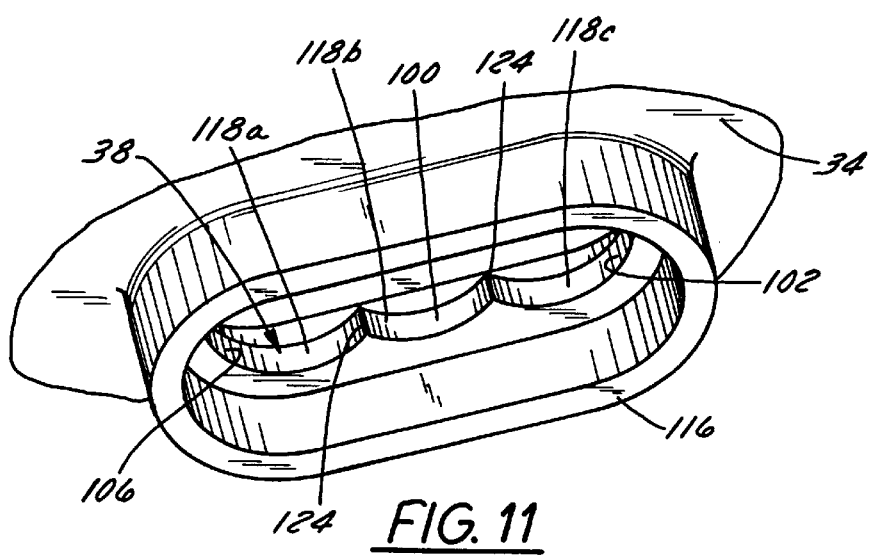
FIG. 11 is a perspective view of an upraised ridge about the periphery of the spring receiving channel for structurally stiffening the channel region while providing support to a spring received in the channel to prevent the spring from collapsing or buckling.

In another similar mechanism shown in FIG. 9, there is a stringer 110 that extends from one sidewall 100 of a channel 38 to the other sidewall 100 of the channel 38 to prevent the sidewalls 100 from separating outwardly from each other in response to a load transferred to and around the sidewalls 100 by a spring 32 in the channel 38. The stringer 110 shown in FIG. 9 is generally U-shaped having an upraised side brace 112 connected to one sidewall 100, a bottom cross beam 114, and another side brace (not shown) connected to the other sidewall 100. By preventing sidewall separation, the spring 32 is more positively captured or retained in the channel 38 and the load of the spring 32 is better transferred to the spring carrier 34 and seating component 42 or 52 that supports the carrier 34.

In a still further spring carrier channel reinforcement, the periphery of the channel 38 is ringed by an upstanding ridge 116 that structurally stiffens the spring carrier 34 in the region of the channel 38 and which preferably also supports at least a portion of the spring 32 during suspension operation to help prevent buckling or collapse of the spring 32 while under static or dynamic loading. Preferably, the ridge 116 is integrally molded as part of the spring carrier 34. If desired, the ridge 116 can be a separate component that is affixed of otherwise attached to the carrier 34 generally adjacent the channel 38 and generally surrounding the channel 38.

Referring to FIGS. 2, 4, 5, & 6, to relatively accurately locate a spring 32 in a channel 38 relative to a portion or component of the seat 40 or seat suspension 30, the channel 38 can be constructed having detents 118. The detents 118 are constructed and arranged to provide discrete stopping points along the channel 38 for positioning a spring 32 received in the channel at a specific location in the channel 38. Preferably, the detents 118 can be used to position a spring 32 at discrete locations relative to the pivot 44 or pivot pin 64 of the suspension 30 to provide the suspension 30 with certain desired load supporting settings depending upon the position of the spring 32 relative to the pivot 44 or pin 64. Where detents 118 are used, each channel 38 of a spring suspension has at least two spaced apart detents 118 for providing the suspension 30 with at least two load supporting settings. Although, the channels 38 shown in FIGS. 2, 4, 6, 9 & 11 have three spaced apart detents 118*a*, 118*b* & 118*c* providing three corresponding discrete spring positions, an adjustable spring channel 38 can have more than three detents 118.

These detents are advantageous because they enable a spring 32 to be positioned at discrete or specific locations relative to the seat suspension pivot 44 or pin 64. For example, the closer a spring 32 is located to the pivot 44 or pin 64 for the seat suspension construction shown in FIGS. 1, 2, 6 & 8, the less load support it will provide making the suspension softer and perhaps more springy or bouncy. Conversely, for these same suspension constructions, the farther a spring 32 is located away from the pivot 44 or pin 64, the spring will provide more load support making the suspension 30 firmer and preferably less springy or bouncy.

Figure 6:
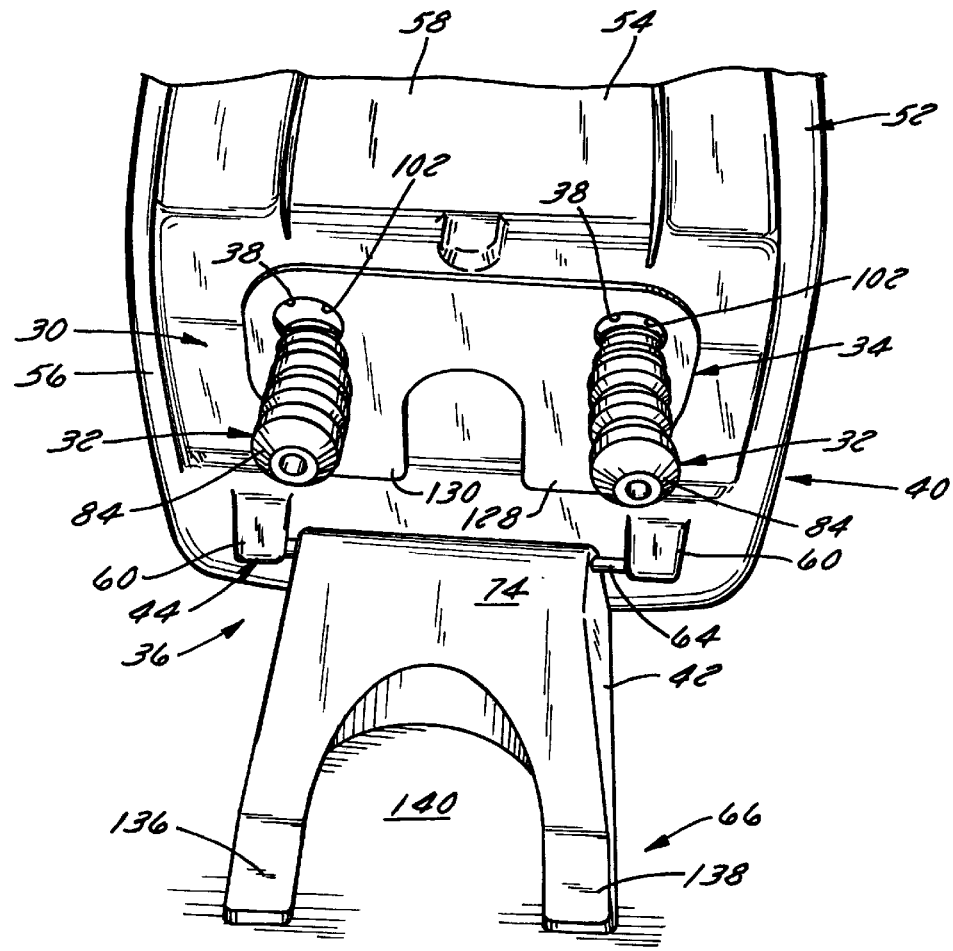
FIG. 6 is a rear perspective view of the seat suspension with the seat tipped upwardly showing the spring carrier plate mounted to the underside of the seat.

In a preferred spring carrier embodiment, each detent 118*a*, 118*b* & 118*c* comprises pairs of opposing arcuate cutouts 120 & 122 FIG. 9) in the channel sidewalls 100. Each pair of opposing cutouts 120 & 122 define a generally circular spring receiving detent 118*a*, 118*b* and/or 118*c* having inwardly extending detent projections 124 between each pair of adjacent detents that preferably resist unwanted random movement of a spring received in the channel. Opposed pairs of inwardly extending detent projections 124 preferably extend inwardly into the channel 38 a sufficient amount such that the distance between the opposing detent projections 124 is at least slightly less than the width or diameter, $d_g$ (FIG. 10) across the groove 88 of the spring 32 for interfering with the spring 32 to prevent the spring 32 from randomly traveling from one detent to the next without being urged by the application of a sufficient amount of force by an operator or an intended seat occupant. To further restrict spring movement, the opposing sidewalls 100 of the spring channel 38 can be constructed so as to bear directly against the spring 32, such as by bearing against the outer radial surface of the groove 88, such that there is a snug or slight interference fit between the channel sidewalls 100 and spring 32.

Where the spring carrier 34 has two or more spaced apart channels 38, such as is depicted in FIGS. 2, 4, & 6, detents 118*a*, 118*b* & 118*c* in each of the channels 38 also allow each spring 32 to be located the same distance away from the pivot 44 or pin 64 so that they provide a similar, if not substantially equal, load support to the seat 40 thereby balancing the suspension 30 on each side of the central axis 98. For example, with a pair of springs 32 mounted in the second detent 118*b* of both channels 38 of the spring carrier 34 shown in FIG. 6, both springs 32 are located about the same distance away from the pivot 44 or pin 64 causing each to provide about the same mechanical advantage and, hence, load support to the seat 40 along both sides of the seat 40.

Although the detents 118 are accomplished with arcuate channel cutouts 120 & 122 having spring movement restricting detent projections 124, detents 118 can be constructed in another manner. For example, one or both sidewalls 100 of a channel 38 can be constructed with notches, instead of cutouts, that engage the spring 32 or complementary notches in the spring to limit spring movement and selectively position a spring 32 received in such a channel construction. Additionally, instead of the generally triangular detent projections 124 produced by the arcuate detent cutouts 120 & 122, the projections 124 or an equivalent thereof can be produced by a opposing pairs of fingers (not shown) that extend inwardly from the channel sidewalls 100 to engage the spring 32, such as by being received in its groove 88, to oppose movement of the spring 32 in the channel 38.

Figure 7:
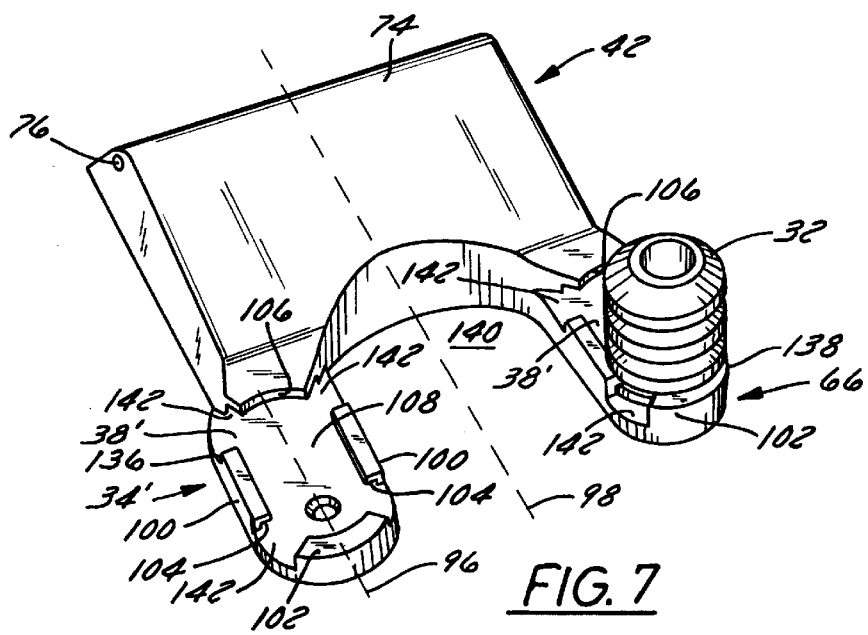
FIG. 7 is a perspective view of an integral seat base and spring carrier.

If desired, the spring carrier 34 can be constructed having channels 38' with no detents, such as is depicted in FIGS. 7 & 8, for permitting a spring 32 received in a detentless channel 38' to be infinitelessly positioned at any location along the channel 38'.

FIGS. 2 and 4–6 show a spring carrier 34 in the form of a plate 126 having a pair of channels 38 in the plate 126 for receiving and capturing a pair of springs 32. The channels 38 are preferably molded or punched into the plate 126. The spring carrier plate 126 preferably is constructed of a flat plate of a generally rigid, strong and resilient material such as a plastic, steel, iron, aluminum, titanium, a metallic alloy, a composite material or another suitable generally rigid, strong and resilient material. If constructed of plastic, the plate 126 can be molded, such as by injection molding or the like.

In a preferred embodiment of the spring carrier plate 126 shown in FIG. 4, the plate 126 is of generally symmetrical or mirror image construction having a first arm 128 that is substantially identical in construction to a second arm 130. The plate 126 has a channel in each arm 128 & 130, both located the same distance away from a centerline that preferably is a central longitudinal axis 98 of the seat 40 or seat suspension 30. As is shown in FIG. 4, the channel 38 of each arm 128 & 130 preferably are located relative to the central seat axis 98 such that their central axes 96 are spaced from the central axis 98 by about the same distance. The front end wall 106 of each channel 38 of the spring carrier 34 preferably is located substantially axially parallel to each other relative to the seat center axis 98. The rear end wall 102 of each channel preferably is also located substantially axially parallel to each other relative to the central axis 98.

Therefore, when a spring 32 is received in each channel 38 they can be located about the same distance from the pivot 44 or pin 64 during operation of the suspension 30 to provide balanced load support to the seat 40. If detents 118 are present and a spring 32 is located in each channel 38 in the same detent 118*a*, 118*b* or 118*c*, they preferably are spaced from the pivot 44 or pin 64 by the about same distance to provide balanced load support.

The plate 126 is carried either by the seat platform 52 or the seat base 42. In the preferred spring carrier plate 126 shown in FIG. 2, the plate 126 is attached to the seat platform 52 and is attached to the underside of the seat shell 54 by at least one fastener 132 and preferably at least a pair of spaced apart fasteners 132 (FIG. 2). To accommodate the fasteners 132, the plate 126 has a pair of spaced apart through-bores 134. For the preferred plate embodiment shown in the drawing figures, the plate 126 has a fastener-receiving bore 134 in each arm 128 & 130. The plate 126 does not have to be attached or affixed to the seat platform 52 adjacent the channels 38 because when the seat 40 is in the operative position shown in FIG. 1 with a spring 32 received in each channel 38 and the seat 40 tipped downwardly overlying the springs 32, the weight of the seat 40 and any occupant 46 of the seat 40 causes the springs to directly bear against the underside of the seat platform 52. If desired, the plate 126 can be attached adjacent the channels 38 to the seat platform 52 or shell 54 provided the plate 126, in the region of the channels 38, is spaced from the underside of the platform 52 or shell 54 a sufficient distance to permit insertion of an end of a spring 32 into each channel 38.

The spring carrier 34' can also be integral with either the seat platform 52 (shell 54) or the seat base 42. FIGS. 7 & 8 illustrate a spring carrier 34' that is integral with the base 42. The exemplary base shown in FIGS. 7 & 8 has a pair of spaced apart legs 136 & 138 which emanate outwardly from the pedestal 74, which generally correspond to the carrier plate arms 128 & 130, and which provide a space 140 between the legs 136 & 138 to conveniently accommodate a storage area or fuel cap access underneath the seat 40.

Molded into the leg of an integral spring carrier 34' adjacent the end of each leg is a channel 38'. The sidewalls 100 of each channel 38' have inturned flanges 104 that are received in the retaining groove 88 of a spring 32 inserted into the channel 38' thereby retaining the spring 32 in the channel 38'. Preferably, both end walls 102 & 106 of each channel 38' also have an inturned flange 104 that is received in the retaining groove 88 of the spring 32 to help retain the spring 32 in the channel 38' when the spring 32 is located near an end wall 102 and/or 106.

To facilitate insertion into and removal from a channel 38', one or both sidewalls 100 of each channel 38' can be discontinuous creating a generally unobstructed clearance zone 142. The clearance zone 142, shown in FIG. 7 on each side of each channel 38' toward the front and back of each channel 38', preferably is smaller than the diameter, $d_g$, of the groove portion 88 of the spring 32 to resist and prevent removal of a spring 32 already received in the channel 38'.

To insert a spring 32, the necked down end 86 preferably is tilted and slipped into a clearance zone 142 between the interlock flange 104 of the sidewalls 100 and the interlock flange 104 of an end wall 102 or 106 until the end of the spring 32 slides into the channel 38' with the flanges 104 received in the spring groove 88. Some deformation of the spring 32 and some force may be required to urge the spring 32 through the clearance zone 142 into engagement with the sidewalls 100 of the channel 38'. To remove a spring 32 received in a channel 38', the spring 32 is moved to adjacent one end 102 or 106 of the channel 38 and tilted such that part of the necked down portion 86 of the spring 32 extends upwardly into the clearance zone 142 sufficiently far such that it clears a portion of the adjacent end wall 102 or 106. As the spring 32 is urged further toward that channel end wall 102 or 106, the necked down portion 86 of the spring 32 clears the end wall 102 or 106 allowing it to be slid further toward the end wall 102 or 106 eventually freeing the spring 32 from engagement with the sidewalls 100 thereby allowing the spring 32 to be completely freed and removed from the channel 38.

Figure 13:
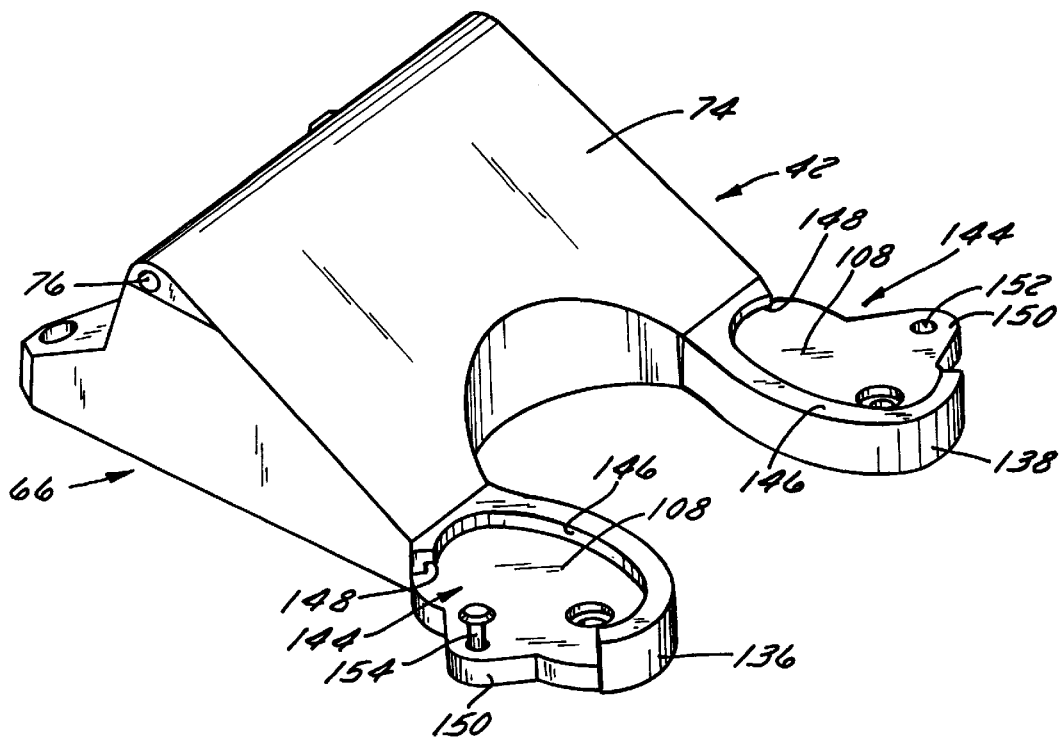
FIG. 13 is a perspective view of the seat base showing a channel and pivot for receiving an elastomeric spring.
Figure 14:
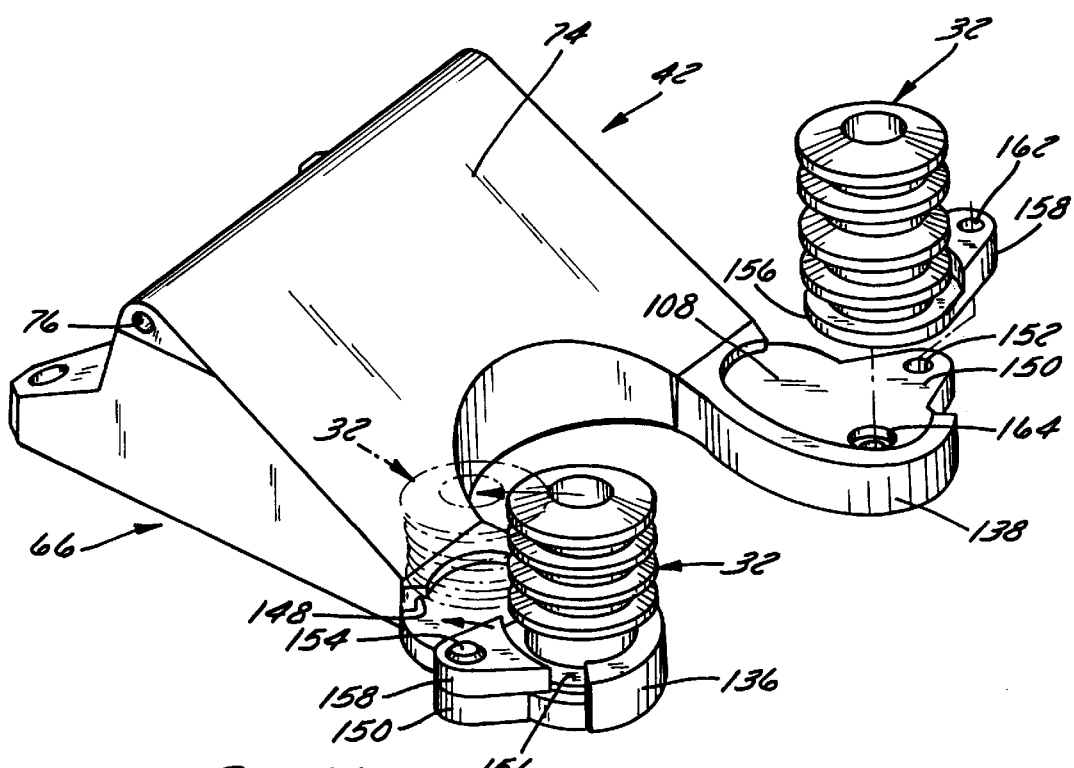
FIG. 14 is a perspective view of the base with springs pivotally mounted to the base such that they can be adjusted relative to the seat attachment pivot.

FIGS. 13 & 14 illustrate another preferred embodiment for adjusting spring position relative to the seat attachment pivot 44. Each arm 136 & 138 of the seat base has a spring receiving channel 144 with a generally arcuately shaped grooved spring-engaging channel wall 146. The wall 146 has an inturned flange 148 that forms a groove for receiving a rib of the spring 32. Extending outwardly from the support wall 108 of the channel 144 is a spring mounting land 150.

The land 150 has a bore 152 preferably for receiving a spring mounting peg 154 or shaft 154 to which the spring 32 is mounted.

The springs 32 shown in FIG. 14 each have a collar 156 with an outwardly extending tab 158 that is depicted substantially complimentary in construction to the spring mounting land 150. The spring mounting land 150 can be smaller or larger than the tab 158. The collar 156 preferably is attached to the spring 32 adjacent one end of the spring 32 but preferably can be constructed so as to attach to the spring 32 at any point along the spring 32. The collar 156 preferably forms a rib 160 that is received in a groove formed between the inturned flange 148 of the sidewall 146 and the spring support surface 108 to help guide and retain the spring 32. The spring mounting tab 158 preferably has a bore 162 into which the spring pivot peg 154 is inserted or received.

While the collar 156 can be constructed of a separate component, the collar 156 can be an integral portion of the spring 32 resulting in the spring 32, collar 156 and tab 158 being of substantially homogenous, one-piece elastomeric or urethane foam construction, if desired. If constructed of a separate component, the collar 156 can be constructed of a more rigid material, such as a plastic, into which one end of the spring 32 is inserted, pressed, or otherwise secured.

When assembled to the base 42 in the manner shown in FIG. 14, the spring 32 is grasped and swung about its mounting pivot peg 154 to position the spring 32 relative to the seat attachment pivot 44 (FIG. 1) for selectively adjusting the characteristics of the seat suspension. The spring 32 can be moved toward or away from the seat attachment pivot 44 depending upon whether it is desirous to increase or decrease the resistance or firmness of the suspension. To discretely position the spring 32, either the spring supporting surface 108 or the bottom of the spring 32 or collar 156 can be equipped with a recess 164 that mates with an outwardly extending boss (not shown) on the other component 32 or 156. One or more of these types of detents can be used to enable the springs 32 to be positioned at certain discrete locations relative to the seat attachment pivot 44.

Although the spring mounting tabs 158 face outwardly in FIGS. 13 & 14, the base 42 can be constructed such that they face inwardly or in another direction. If the base 42 is constructed so that the spring mounting tabs 158 face inwardly such that they are adjacent to each other, each tab 158 can have a plurality of outwardly extending gear teeth (not shown) which engage each other so that movement of one spring 32 of a pair of springs 32 in a suspension 30 will cause the other spring 32 to move substantially in unison to help position both springs 32 about the same distance from the seat attachment pivot 44 to help balance the suspension 30.

Figure 15:
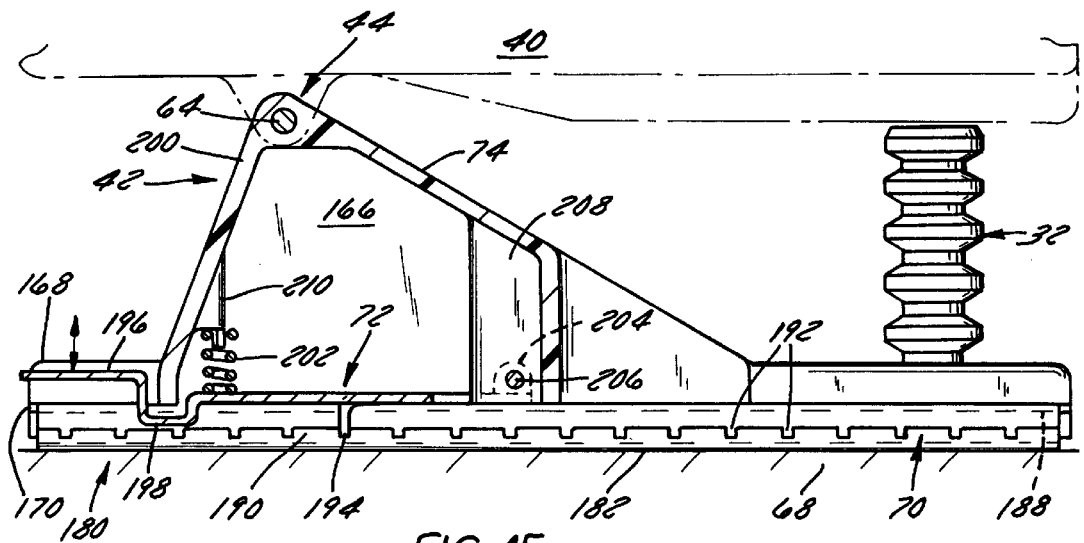
FIG. 15 is a cross sectional view of the seat and base carried by a seat slide assembly enabling the seat to be selectively moved fore and aft.
Figure 16:
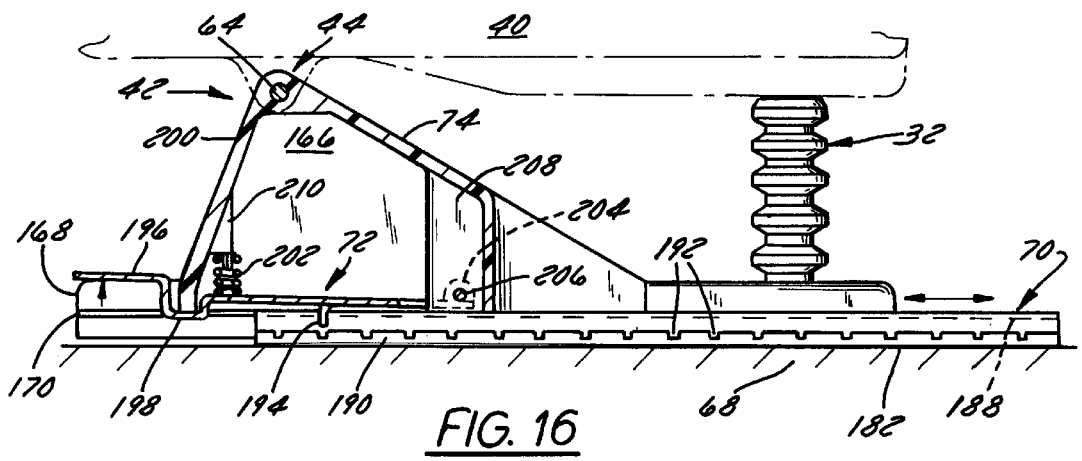
FIG. 16 is a cross sectional view of the seat and base with the latch in its unlatched position permitting the seat to move.
Figure 17:
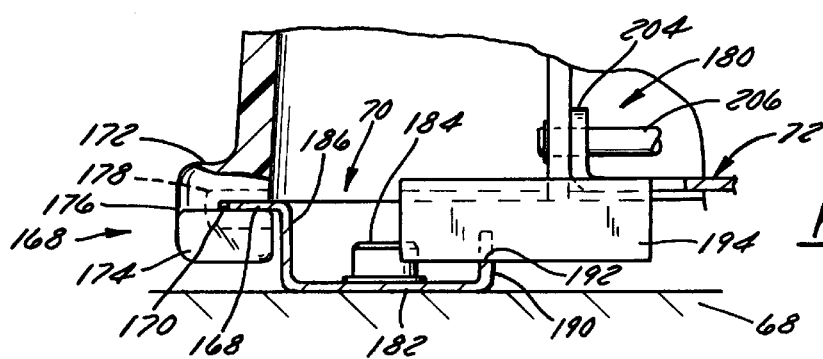
FIG. 17 is an enlarged fragmentary cross sectional view of the seat slide assembly showing the details of its construction.

Referring to FIGS. 15–17, the seat base 42 preferably is constructed of a thermoplastic, a thermoset, a plastic, an elastomeric material, or another type of polymeric material, that is easily moldable or formable while also being sufficiently strong and rigid so as to support the weight of a person sitting on the seat and the shocks and jolts encountered during operation. Preferably, the base 42 is constructed of 90% density structural foam polypropylene and can be fortified with carbon, nylon, glass fibers or another reinforcement material, if desired. As such, the base 42 can be of composite elastomeric or composite plastic construction.

In the preferred construction of the base 42 shown in FIGS. 15–17, the underside of the base 42 preferably is hollow such that it has a recess 166. Each side of the base 42 has an integrally molded movable slide rail 168 that includes a channel 170 for receiving a fixed seat slide 70 that is anchored to the vehicle floor 68 such as is shown in FIG. 2 and depicted in more detail in FIG. 17. While the channel 170 of the movable slide rail 168 preferably is molded, it can be machined after molding, such as by broaching, grinding, shaving, cutting, melting, or constructed using another plastic removal process, a plastic forming process or another method.

As is shown in FIG. 17, each movable seat slide rail 168 is integrally formed as part of the base 42 such that the base 42 and rail 168 move in unison when moving the seat 36 fore or aft. Each integral seat slide rail 168 has an upper slide rail portion 172, a lower slide rail portion 174 and a web 176 that connects the upper and lower rail portions 172 & 174 together. The space between the upper rail portion 172 and lower rail portion 174 defines the channel 170 with the channel gap or channel opening preferably being just wide enough to accommodate the fixed seat slide 70. In a preferred seat slide rail construction, the channel 170 of each rail 168 forms at least a slight interference fit with the fixed seat slide rail 70 to help keep the rail 70 in the channel 170 while enabling relative movement between slidably interlocked rails 70 & 168 when sufficient force is applied. Preferably, the upper and lower rail portions 172 & 174 have a cross sectional thickness that are each at least twice and preferably at least three times the cross sectional thickness of that portion of the fixed rail 70 received in the channel 170 for producing a plastic seat slide rail 168 that is sufficiently strong and rigid. The web 176 preferably also has a cross sectional thickness that is at least about twice the cross sectional thickness of that portion of the fixed slide rail 70 that is received in the channel 170 for minimizing flexure of the plastic rail 168 to minimize and preferably substantially prevent the upper slide rail portion 172 from separating from the lower slide rail portion 174.

As is indicated in phantom in FIG. 17, the channel 170 can be lined with a liner 178, such as a sleeve, wear resistant points or portions, or a different kind of liner. If wear resistant points are used, they preferably comprise spaced apart immovable inserts received in the channel 170 which underlie or overlie the fixed rail 70 and directly bear against the rail 70 during operation. If a liner 178 is used, the sleeve or wear resistant portion or portions can be constructed of metal, such as a hardened steel possessing a high degree of wear resistance, a nylon, a ceramic composition, a composite, or another durable, wear resistant material. If desired, the liner 178, as well as the channel 170 itself, can be of self-lubricating construction, such as by being impregnated with a lubricant or constructed of a material that is inherently self-lubricating.

Whether or not a liner 178 is used, each pair of slidably interlocked slide rails 168 & 70 preferably do not have metal-to-metal contact along their surface area of contact. Preferably, no rolling element type bearings, such as ball bearings, roller bearings, or needle bearings, are required between interlocked rails 70 & 168 helping to make the seat adjuster 180 of low profile construction. Moreover, this low profile construction is further enhanced because each top slide rail 168 is integrally formed as part of the base 42.

The fixed bottom slide rails 70 each have a bottom wall 182 that is anchored to the vehicle floor 68 by at least one and preferably at least two spaced apart fasteners 184, such as is shown in FIG. 17. One or more of the fasteners 184 can also function as stops to limit the relative travel of the seat base on the rail 70. Preferably, the stop 184 extends upwardly from the rail 70 sufficiently so as to bear against a portion of the seat base 42 to limit seat base movement. In this manner, the seat slide 70 can have a forward stop for limiting forward travel of the seat 36 and base 42 and a rearward stop for limiting rearward travel of the seat 36 and base 42.

Extending upwardly from the bottom wall 182 of the rail 70 is an outboard sidewall 186 that has a generally perpendicular flange 188 that is received in the channel 170 of the movable slide rail 168. In the preferred embodiment shown in FIG. 17, the flange 188 preferably extends outwardly. Depending upon the construction of the seat base slide rail 168 and other design factors, the flange 188 can be canted at an angle from its perpendicular orientation shown in FIG. 17 or can be an inturned flange that extends generally inwardly.

Opposite the flanged sidewall 186 is a generally upwardly extending inboard sidewall 190 that cooperates with the latch 72 to lock the position of the base 42 relative to the fixed slide rail 70. The inboard sidewall 190 has a plurality of spaced apart notches 192 that can be engaged by a tooth 194 of the latch 72 to cause the latch 72 to lock the position of the seat 36 and base 42 relative to the fixed slide 70 when the latch 72 is in the latched position (FIG. 15).

Preferably, each fixed slide rail 70 is constructed of a metal, such as preferably a steel, an aluminum, titanium, or another suitable metal. If fashioned of steel, the rail 70 can be inexpensively stamped and notched to form the finished rail 70 shown in FIGS. 2, and 15–17. Preferably, each fixed slide rail 168 is constructed from the same material as the seat base 42 and preferably is constructed of a plastic, such as preferably 90% density structural foam polypropylene.

The latch 72 has a body with a hand grip portion 196 that preferably extends slightly outwardly from underneath the base 42. The latch body has a crease or recessed portion 198 that provides clearance about a sidewall 200 of the pedestal 74 for enabling the latch 72 to be lifted such that its teeth 194 completely clear any notch 192 such that the latch 72 is unlatched (FIG. 16) permitting the seat 36 and base 42 to be moved along the fixed slide rails 70. A biasing element 202 that preferably is a coil spring 202 is disposed between the body of the latch 72 and the underside of the base 42. The latch teeth 194 are formed by a pair of spaced apart "wings" at each side of the latch body. When in the latched position, each tooth 194 is received in a notch 192 in the inboard sidewall 190 of each fixed slide rail 70, such as in the manner shown in FIGS. 15 & 17. Rearwardly of the latch teeth 194 are a pair of spaced apart upstanding mounting ears 204 that each have a through bore for receiving a pivot pin 206 therethrough that pivotally mounts the latch 72 to the seat base 42.

Preferably, the latch 72 is constructed of a metal, such as preferably a steel, an aluminum or another suitable metal. For example, if fashioned of steel, the latch 72 can be inexpensively stamped and cut or machined.

Within the pedestal recess 166 is a latch mount that preferably consists of a bore through at least one and preferably two vertical integral ribs 208 of the base 42. When the latch 72 is assembled to the base 62, the pivot pin 206 extends through the bore in each rib 208 and the bore in each latch handle mounting ear 204. The coil spring 202 is disposed is between the latch 72 and a spring receiver 210 molded into the base recess. The spring receiver 210 preferably is a rib or the like that has an outwardly projecting boss (FIGS. 15 & 16) over which part of the spring 202 telescopes.

When assembled, the body of the latch 72 lies underneath the pedestal portion of the base 42 with at least a portion of the hand grip 196 exposed and accessible by an occupant 46 of the seat 36. The pivoting attachment of the latch 72 permits the latch 72 to be lifted until its teeth 194 are free of the fixed rail inboard sidewall 190 thereby permitting the seat 36 and base 42 to be moved forwardly or rearwardly along the fixed rails 70. When released, the spring 202 urges the latch 72 toward the fixed rails 70 until the latch handle teeth 194 are each received in a notch 192 in an inboard sidewall 190 thereby preventing further fore or aft movement of the seat 36.

The seat adjuster 180 is of low profile construction making it particularly well suited for small off-road vehicle applications that require relatively small seats. The adjuster 180 achieves this low profile construction by not requiring any rolling-type bearings between the slidably interlocked seat slide rails 70 & 168. Contact between each pair of interlocked rails 70 & 168 preferably is direct and in a preferred construction, the seat adjuster 180 consists of a non-metallic seat base material of the seat slide rail 168 directly bearing against a metallic fixed seat slide rail 70 along at least a portion of the length of interlocked seat slide rails 70 & 168.

The base 42 and integral seat slide rails 168 are preferably of one-piece unitary construction and preferably constructed using at least one of the following manufacturing methods: blow molding, thermoforming, rotational molding, injection molding, compression molding, vacuum molding, casting or forging or by another suitable process. Preferably, the finished molded seat base 42 requires a minimum of machining or other post-molding processing as a result of being molded thereby minimizing its cost and manufacture time.

In use, the vehicle seat of this invention is preferably used for vehicle seating in off-road vehicles, such as lawn and garden tractors, small industrial and agricultural tractors, turfcare equipment (such as what is used on golf courses), smaller road grading, compacting and other road construction equipment, lift trucks, all terrain vehicles (ATVs) and any other vehicle requiring a seat suspension 30 of this construction, reliability and durability. The seat adjuster construction has an advantageously low profile enabling a vehicle seat 36 of this construction to be used in vehicles which have relatively small seat packaging requirements.

While the adjustable spring carrier 34 permitting substantially non-metallic or unidirectionally deformable springs 32 that preferably are of elastomeric construction to be moved or positioned relative to the seat 40 to provide load compensating adjustment is particularly well suited for use in single pivot seat suspensions, such as the single pivot seat suspension 30 shown in the drawing figures, a spring carrier 34 of the same or like construction, using non-metallic or elastomeric springs which preferably are unidirectionally deformable can be used with other types of seat suspensions, including, for example, a seat suspension which uses a scissors linkage or the like. While the spring carrier 34 can be constructed to adjustably receive a single spring 32, enabling the single spring 32 to be selectively positioned relative to the pivot 44, pivot pin 64, or another portion of the seat 40 or suspension 30, a spring carrier 34 can also be constructed for use with two, three or more spaced apart springs 32.

In operation, to enable a pair of springs 32 to be inserted into the spring carrier 34, the seat 40 is tipped forwardly about its pivot 44, such as is shown in FIGS. 6 & 8. To insert a spring 32 into a channel 38 of the carrier 34, the end of the spring 32 having the retaining groove 88 is urged into the channel 38, preferably causing a portion of the spring 32 to at least slightly deform. The spring 32 is then urged with sufficient force into the channel 38 to cause it to deform until the necked down portion 86 clears the channel sidewalls 100 causing the sidewall 100 or flange 104 to be received in the retaining groove 88.

Movement of the spring 32 along its channel 38 is enabled by tipping the seat 40 upwardly about its pivot 44 generally toward the position shown in FIGS. 6 & 8 such that the mounted springs 32 are at least partially exposed. To move a spring 32, the spring 32 is preferably manually grasped and urged along the channel 38 until the desired position is reached. Advantageously, the spring 32 preferably does not need to twisted to free it from its location in the channel 38 to move the spring 32 and no fasteners need to be removed or loosened before or during spring movement. Preferably, the spring 32 is moved to a desired location relative to the pivot 44 to provide a desired amount of load compensation or a desired amount of resistance to the weight of a seat occupant 46. Where two or more springs 32 are used, each of the springs 32 are preferably moved to about the same position relative to the seat suspension pivot 44 to provide balanced load compensation or weight resistance transversely across the seat 40.

An exception to the preferred practice of locating all springs 32 about the same distance away from the pivot 44 is where the load supporting or weight resisting characteristics of one of the springs 32 of the suspension 30 are not equal to the load supporting or weight resisting characteristics of another spring 32 of the suspension 30. If this happens, one spring 32 can be moved to one position in a spring carrier channel 38 that is a first distance away from the pivot 44 and the other spring 32 can be moved to another position in the other spring carrier channel 38 that is a second distance away from the pivot 44 not equal to the first spring distance such that the springs 32 support an equal load or an equal amount of weight even though they are located two different distances away from the pivot 44. Some trial and error in locating the springs 32 may be required before a relatively balanced load supporting or weight resisting condition is achieved. As such, the spring carrier 34 and seat suspension 30 advantageously permit springs 32 having different load supporting or weight resisting characteristics to be used to support a seat occupant 46 in a stable and balanced manner. More specifically, due to the spring location adjustment provided by the spring carrier 34 and suspension 30, spring deficiencies can be offset or compensated for in a manner that will not adversely affect overall suspension performance.

During operation, with a seat occupant 46 in the seat 40 in the operative position shown in FIG. 1, the springs 32 stably support the weight of the seat occupant 46 as well as any other loading of the seat suspension 30 as a result of the vehicle carrying the seat encountering bumps, jolts, other uneven terrain or changes in momentum or direction. As a result of the springs 32 being loaded their position is fixed relative to the pivot 44 locking their position in their channel 38.

Should the occupant desire to adjust the suspension 30, the seat 40 can be tipped at least slightly forwardly or upwardly (FIGS. 6 & 8) and one or both springs 32 are moved along their channel 38 moving the springs 32 relative to the pivot 44. Thereafter, the seat 40 is tipped downwardly to its operative position (FIG. 1) and the seat occupant 46 sits in the seat 40. Any further seat suspension adjustment can be made in this fast and simple manner.

In operation of the seat adjuster 180, the latch hand grip 196 is grasped, preferably by the seat occupant 46, and lifted. As the latch 72 is lifted, its teeth 194 disengage from the inboard sidewall notches 192 permitting the seat 36 to be moved forwardly or rearwardly along the fixed rails 72. When the desired seat position is reached, the latch 72 is released, causing the spring 202 to urge the latch teeth 194 toward the fixed rails 70. As the latch 72 pivots toward the fixed rails 70, the teeth 194 are each received in a notch 192 in the inboard fixed slide rail wall 190 preferably locking the seat 36 in place preventing its further movement.

It is also to be understood that, although the foregoing description and drawings describe and illustrate in detail at least one working embodiment of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. A seat for a vehicle comprising: a vehicle floor, a base carried by the vehicle floor, a seat occupant supporting surface carried by the base, a seat suspension in operable cooperation with the seat occupant supporting surface and the base, and a seat adjuster in operable cooperation with the seat base and the vehicle floor for enabling the seat to be moved relative to the vehicle floor, wherein the seat adjuster comprises
   a) the base being of substantially non-metallic construction;
   b) a pair of spaced apart metallic bottom slide rails fixed to the vehicle floor with each slide having a bottom wall anchored to the vehicle floor, a pair of upwardly extending spaced apart walls with one of the walls having a flange;
   c) a pair of spaced apart movable top slide rails integral with the base with each of the movable slide rails having a non-metallic upper slide rail portion connected by a non-metallic web to a non-metallic lower slide rail portion with the upper slide rail portion spaced from the lower slide rail portion and defining a channel therebetween that receives the flange of one of the fixed seat slide rails; and
   d) wherein each of the bottom seat slide rails slidably interlocks with one of the top seat slide rails to enable the seat base and seat to be moved relative to the vehicle floor.

2. The vehicle seat of claim 1 further comprising a) a seat platform carrying the seat occupant supporting surface, b) a spring carrier carried by either the platform or the base with the spring carrier having a receptacle for receiving a spring and the receptacle constructed and arranged to permit the spring to be pivotably moved relative to the seat to selectively adjust resistance to a force applied or transmitted to the seat, and c) a non-metallic spring.

3. The vehicle seat of claim 2 wherein the base and non-metallic rails are comprised of plastic and the spring is comprised of an elastomeric material.

4. The vehicle seat of claim 1 further comprising a) a seat platform carrying the seat occupant supporting surface with the seat platform carried by the base, b) a spring, and c) wherein 1) the base has an upstanding pedestal for spacing the seat platform above the vehicle floor, and 2) the seat platform is attached to the seat base by at least one pivot with the spring spaced from the pivot.

5. The vehicle seat of claim 4 wherein the suspension comprises a pair of spaced apart generally cylindrical deformable elastomeric springs that are each received in a channel in either the base or the seat platform wherein 1) the channel is defined by i) a pair of spaced apart sidewalls that each have an inturned flange for engaging one of the springs received in the channel, ii) an endwall, and iii) a bottom wall against which an end of the spring bears when a load is applied, and 2) the channel permits each spring to be moved relative to the at least one pivot for adjusting the suspension.

6. The vehicle seat of claim 1 wherein the suspension comprises a single pivot seat suspension.

7. The vehicle seat of claim 1 further comprising a seat platform carrying the seat occupant supporting surface and wherein the suspension is a single pivot seat suspension having at least one generally cylindrical elastomeric spring disposed between the seat platform and the seat base.

8. The vehicle seat of claim 1 further comprising a seat platform carried by the base and carrying the seat occupant supporting surface, a pivot hingedly attaching the seat platform to the base, an elastomeric spring spaced from the seat attachment pivot and disposed between the platform and a portion of the base, a spring mounting tab carried by the spring, a spring mounting pivot for mounting the spring by its spring mounting tab to either the seat platform or the seat base, and wherein the spring can be swung about the spring mounting pivot for moving the spring relative to the seat attachment pivot to change the weight resistance and firmness of the suspension.

9. The vehicle seat of claim 8 wherein the seat base has a pair of spaced apart spring receiving channels with an elastomeric spring of elongate and generally cylindrical construction pivotally attached adjacent each channel such that the elastomeric spring can be swung about its pivot toward or away from the seat attachment pivot.

10. The vehicle seat of claim 9 wherein the spring mounting tab extends radially outwardly from the spring.

11. The vehicle seat of claim 10 further comprising a collar carried by the spring having the spring mounting tab extending radially outwardly from the collar.

12. The vehicle seat of claim 1 wherein there are no ball bearings, roller bearings, or needle bearings between each interlocked top and bottom seat slide rail.

13. The vehicle seat of claim 12 wherein the movable slide rails are constructed of a plastic and the fixed slide rails are constructed of a metal.

14. The vehicle seat of claim 1 wherein the flange of each bottom seat slide rail is generally flat and the channel defined by the non-metallic upper and lower slide rail portions is generally straight for enabling the flange to be received in the channel and to slide along the channel with the flange directly bearing on at least a portion of one of the non-metallic upper slide rail portion and the lower non-metallic slide rail portion.

15. The vehicle seat of claim 1 wherein 1) the other of the walls of each of the bottom slide rails has a plurality of pairs of notches 2) the base has a recess and further comprising a latch received in the recess and operably connected to the base with the latch having 1) at least two spaced apart latch teeth with one of the teeth for engaging one of the notches in one of the bottom seat slide rails and the other of the latch teeth for engaging one of the notches in the other of the bottom seat slide rails and 2) a portion accessible to a seat occupant that can be grasped and maneuvered to urge the latch from i) a latched position where each latch tooth is received in one of the seat slide rail notches preventing relative movement between the seat and vehicle floor toward ii) an unlatched position where each latch tooth is free of any of the seat slide rail notches allowing the seat to be moved relative to the vehicle floor.

16. The vehicle seat of claim 15 further comprising a biasing element received in the base recess that operably cooperates with the latch and the base for urging the latch toward the latched position.

17. The vehicle seat of claim 16 wherein the biasing element comprises a coil spring received in the base recess that is disposed between the latch and the base for urging the latch toward the latched position.

18. The vehicle seat of claim 17 wherein the base further comprises a spring receiver in the base recess over which a portion of the coil spring is telescoped.

19. The vehicle seat of claim 15 wherein the base further comprises a pair of spaced apart ribs with a pivot pin connecting the latch to each rib permitting the latch to be pivoted between the latched position and the unlatched position.

20. The vehicle seat of claim 1 further comprising a liner lining each of the channels.

21. The seat suspension of claim 2 wherein the spring is of non-straight construction for being tailored in shape to the load applied to the spring.

22. The seat suspension of claim 21 wherein the spring is of generally cylindrical and curved construction such that it has a generally curvilinear longitudinal central axis.

23. The vehicle seat of claim 2 wherein the spring is made of a copolyester elastomer of substantially non-porous construction for being easily painted or dyed.

24. The vehicle seat of claim 23 wherein the spring is composed of HYTREL.

25. The vehicle seat of claim 5 wherein the springs are each attached to the base by a pivot that permits the springs to be moved relative to the seat pivot.

26. A vehicle seat comprising:
   a) a vehicle floor;
   b) a seat occupant supporting surface;
   c) a base disposed between the vehicle floor and the seat occupant supporting surface;
   d) a slide rail carried by the base;
   e) a slide rail carried by the vehicle floor that cooperates with the base slide rail for permitting the vehicle seat to be moved relative to the vehicle floor;
   f) wherein one of the slide rails is of plastic construction;
   g) wherein the one slide rail has a plastic upper slide rail portion and a plastic lower slide rail portion spaced from the upper slide rail portion by an interconnecting plastic web defining a channel between the plastic upper and lower slide rail portions that is of substantially straight construction for receiving a portion of the other slide rail and which supports the other slide rail without any roller bearings, ball bearings or needle bearings disposed between the vehicle floor slide rail and the base slide rail.

27. The vehicle seat of claim 26 wherein one of the slide rails has a plurality of spaced apart notches and further comprising a latch operably connected to the base and having at least one latch tooth that is constructed to be received in a slide rail notch for preventing relative movement between the seat occupant supporting surface and the vehicle floor.

28. The vehicle seat of claim 27 wherein the base and the plastic slide rail are of one piece unitary construction.

29. The vehicle seat of claim 28 wherein the base is constructed of plastic and the plastic slide rail and base are molded such that they form a single component of substantially homogenous construction.

30. The vehicle seat of claim 28 further comprising an insert received in the channel of the plastic seat slide rail.

31. The vehicle seat of claim 28 further comprising a single pivot operably connecting the seat occupant supporting surface to the seat base and at least one elastomeric spring of generally cylindrical construction disposed between the seat occupant supporting surface and a portion of the base and which forms a single pivot seat suspension constructed and arranged to permit the spring to be moved relative to the seat pivot for selectively adjusting the load supporting characteristics of the seat suspension.

32. A vehicle seat oriented in a fore to aft direction comprising:
   a) a vehicle floor;
   b) a non-metallic base carried by the vehicle floor;
   c) a seat occupant supporting surface carried by the base;
   d) a spring carrier in operable communication with either the base or the seat and having a receptacle for receiving a spring that is constructed and arranged to permit the spring to be moved fore and aft relative to the seat;
   e) at least one non-metallic and generally cylindrical spring disposed between the base and the seat with at least a portion of the spring in operable communication with the spring receiving receptacle;
   f) a seat slide rail carried by the base;
   e) a seat slide rail supported by the vehicle floor which cooperates with the seat slide carried by the base to permit the seat to be moved fore and aft relative to the vehicle floor;
   f) wherein the spring carrier has a spring receiving receptacle that comprises a channel constructed and arranged to receive the spring while allowing the spring to be moved along the channel;
   g) wherein the channel is defined by a pair of spaced apart sidewalls, a pair of spaced apart endwalls, and a bottom wall joining the sidewalls; and
   h) wherein the spring bears against the bottom wall when it is received in the channel and a load is applied to the seat.

33. The vehicle seat of claim 32 wherein the channel is integrally formed in the base.

34. The vehicle seat of claim 33 wherein the base is comprised of plastic.

35. The vehicle seat of claim 32 wherein the spring comprises a radially outwardly extending rib about its circumference and each of the sidewalls further comprises an inturned flange that defines a groove between the inturned flange and the bottom wall for receiving at least a portion of the rib of the spring for retaining the spring in the channel while permitting the spring to move along the channel.

36. The vehicle seat of claim 35 wherein each of the endwalls further comprises an inturned flange that defines a groove between the inturned flange and the bottom wall for receiving at least a portion of the rib of the spring for retaining the spring in the channel while permitting the spring to move along the channel.

37. The vehicle seat of claim 35 comprising a pair of the channels wherein the pair of the channels are laterally spaced apart from each other and a pair of the springs with one of the springs received in one of the channels and the other of the springs received in the other of the channels.

38. The vehicle seat of claim 32 wherein the spring is attached to the base by a pivot that permits the springs to be moved relative to the channel.

39. The vehicle seat of claim 32 further comprising 1) a seat platform carrying the seat occupant supporting surface and 2) a pivot pin pivotably mounting the seat platform to the base, and wherein 1) the spring is spaced from the pivot pin in an aft direction, 2) the channel is disposed in either the base or the seat platform, and 3) the spring is disposed between the seat platform and the seat base.

40. The vehicle seat of claim 32 wherein the spring is comprised of a copolyester elastomer.

41. The vehicle seat of claim 40 wherein the spring has a spring rate that increases as the spring is compressed.

42. The vehicle seat of claim 32 wherein the spring is curved about its longitudinal axis.

43. The vehicle seat of claim 32 wherein the seat slide carried by the base comprises a non-metallic seat slide integral with the base.

44. The vehicle seat of claim 42 wherein the non-metallic seat slide rail comprises a non-metallic upper rail portion connected by a non-metallic web portion to a non-metallic lower rail portion with the upper rail portion spaced from lower rail portion defining a channel therebetween that receives a portion of the seat slide rail that is supported by the floor.

45. The vehicle seat of claim 44 comprising a pair of the non-metallic seat slide rails that are laterally spaced apart from each other and which both extend in a fore-aft direction and a pair of the seat slide rails supported by the floor that are laterally spaced apart from each other and which both extend in a fore-aft direction wherein one of the seat slide rails supported by the floor slidably mates with one of the non-metallic seat slide rails and the other of the seat slide rails supported by the floor slidably mates with the other one of the non-metallic seat slide rails.

46. The vehicle seat of claim 44 wherein the seat slide rail supported by the floor slidably mates with the non-metallic seat slide rail wherein no roller bearings, ball bearings or needle bearings are provided between the seat slide rails.

47. The vehicle seat of claim 44 further comprising an insert disposed in the channel between the upper rail portion and the lower rail portion and wherein the insert is generally U-shaped for slidably receiving the seat slide rail supported by the floor.

48. A vehicle seat comprising:
    a) a vehicle floor;
    b) a seat upon which a seat occupant can sit;
    c) a plastic base disposed between the vehicle floor and the seat with the base having a recess and a pair of spaced apart longitudinally extending integral top seat slide rails with each rail having a channel defined by a plastic upper seat slide rail portion that is spaced from a plastic lower seat slide rail portion;
    d) a suspension in operable communication with the base and the seat;
    e) a pair of spaced apart longitudinally extending metallic bottom slide rails each having a bottom wall secured to the vehicle floor and a pair of spaced apart upstanding sidewalls with one of the sidewalls having a plurality of longitudinally spaced notches and the other of the sidewalls having a flange that is received in a channel in a seat slide rail of the base for enabling the seat to be moved relative to the vehicle floor;
    f) a latch having 1) a body received in the base recess that is operably connected to the base, 2) a pair of spaced apart latch teeth extending from the latch base for each being received in a notch of a seat slide rail sidewall, and 3) a hand grip portion capable of being grasped by a seat occupant to move the latch from a latched position where each latch tooth is received in a notch of a seat slide rail sidewall preventing the seat occupant supporting surface from being moved away from the latched position such that each latch tooth is free of any notch permitting the seat occupant surface to be moved relative to the vehicle floor.

49. The vehicle seat of claim 48 wherein the base and top slide rails are of one piece, unitary and molded construction.

50. The vehicle seat of claim 49 wherein the base further comprises an integral upstanding pedestal that extends upwardly from the base for spacing the seat above the vehicle floor.

51. The vehicle seat of claim 48 wherein the seat suspension is a single pivot suspension.

52. The vehicle seat of claim 50 wherein the seat suspension further comprises a pair of spaced apart elastomeric, deformable and generally cylindrical compression springs disposed between the seat and base.

53. A vehicle seat comprising:
    a) a vehicle floor;
    b) a seat;
    c) a non-metallic base carrying the seat with the base having an integral bottom with a pair of integral and spaced apart longitudinally extending recessed channels in the bottom of the base;
    d) a pair of longitudinally extending metallic slide rails anchored to the floor with at least a portion of one of the slide rails received in one of the channels in the base and at least a portion of the other of the slide rails received in the other of the channels in the base for enabling the base to move on the slide rails relative to the vehicle floor.

54. The vehicle seat of claim 53 wherein the base, the bottom of the base, and the channels are molded of plastic and form a unit of one-piece, unitary construction.

55. The vehicle seat of claim 54 wherein the metallic slide rails are of stamped steel construction.

56. A seat for a vehicle comprising:
    a) a vehicle floor;
    b) a base carried by the vehicle floor;
    c) a seat platform attached by a seat platform attachment pivot to the base;
    d) a seat occupant surface carried by the seat platform; and
    e) a seat suspension in operable cooperation with the 1) seat platform and 2) the seat base wherein the seat suspension comprises
        1) an elastomeric spring spaced from the seat platform attachment pivot that is disposed between the seat platform and the base and;
        2) a spring mounting pivot carrying the spring and which is mounted to the base; and
        3) wherein the spring can be pivoted about the spring mounting pivot to move the spring relative to the seat platform attachment pivot for changing the firmness of the seat suspension.

57. The vehicle seat of claim 56 further comprising a seat adjuster in operably associated with the base and the floor for permitting the seat occupant supporting surface to be moved relative to the floor.

58. A seat comprising:
    a) a floor;
    b) a plastic base having a front and rear wherein the base is supported by the floor and disposed in a fore-aft direction;
    c) a seat platform connected by a pivot to the base;
    d) a seat occupant supporting surface carried by the seat platform;

e) a spring carrier carried by either the seat platform or the base with the spring carrier including a pair of laterally spaced apart receptacles spaced in an aft direction from the pivot for each receiving a spring wherein each receptacle is constructed and arranged to permit a spring to move in a fore-aft direction relative to the base;

f) a pair of non-metallic and generally cylindrical springs with one of the springs in operable cooperation with one of the receptacles and the other of the springs in operable cooperation with the other one of the receptacles; and g) a rail assembly for permitting fore-aft movement of the position of the base relative to the vehicle floor wherein the rail assembly comprises 1) a pair of laterally spaced apart, fore-aft extending rails carried by the vehicle floor with each of the rails having a flange, and 2) a pair of laterally spaced apart, fore-aft extending channels that are each integrally formed in the base and that each receive the flange of one of the rails.

59. The seat of claim 58 wherein the base is comprised of plastic, the rails are each comprised of metal, the foam springs are each comprised of an elastomer, the metal rails are each immovably mounted to the floor, and the rail assembly is constructed and arranged to permit the fore-aft position of the base to be selectively adjusted.

60. The seat of claim 58 further comprising:

1) a pair of metal inserts that each have a channel with i) one of the metal inserts received in one of the channels in the base and ii) the other of the metal inserts received in the other of the channels in the base, and 2) wherein i) the flange of one of the metal rails is received in the channel in one of the metal inserts and ii) the flange of the other of the metal rails is received in the channel in the other of the metal inserts.

61. The seat of claim 58 further comprising:

1) a latch pivotally mounted to the base having i) a handle adjacent the front of the base that is accessible by an occupant of the seat, and ii) a pair of laterally spaced apart teeth;

2) wherein each of the metal rails has a plurality of pairs of spaced apart notches that are each capable of receiving one of the teeth of the latch; and 3) wherein the latch is manually pivotable between i) a latched position where one of its teeth is received in one of the notches in one of the metal rails and the other of its teeth is received in one of the notches in the other of the metal rails thereby preventing the base from moving in a fore-aft direction relative to the vehicle floor, and ii) an unlatched position where each of its teeth are completely free of any of the notches in the metal rails thereby permitting the base to move in a fore-aft direction relative to the vehicle floor.

62. The seat of claim 61 further comprising a biasing element disposed between the base and the latch that urges the latch toward the latched position.

* * * * *